(12) United States Patent
Khlat

(10) Patent No.: US 9,420,395 B1
(45) Date of Patent: Aug. 16, 2016

(54) UE ANTENNA TUNER CONTROL VIA NODE-B INNER POWER CONTROL LOOP

(75) Inventor: Nadim Khlat, Midi-Pyrenees (FR)

(73) Assignee: Qorvo US, Inc., Greensboro, NC (US)

( * ) Notice: Subject to any disclaimer, the term of this patent is extended or adjusted under 35 U.S.C. 154(b) by 482 days.

(21) Appl. No.: 12/951,302

(22) Filed: Nov. 22, 2010

Related U.S. Application Data

(60) Provisional application No. 61/263,129, filed on Nov. 20, 2009.

(51) Int. Cl.
*H04W 4/00* (2009.01)

(52) U.S. Cl.
CPC ...................................... *H04W 4/00* (2013.01)

(58) Field of Classification Search
CPC ........................................................ H04B 1/40
USPC ................. 370/277–281, 329–338, 509–545; 455/127, 558, 522
See application file for complete search history.

(56) References Cited

U.S. PATENT DOCUMENTS

| | | | |
|---|---|---|---|
| 6,628,924 B1 * | 9/2003 | Miyamoto | 455/69 |
| 2005/0003846 A1 * | 1/2005 | Anderson | 455/522 |
| 2007/0184794 A1 * | 8/2007 | Drogi et al. | 455/127.1 |
| 2008/0090539 A1 * | 4/2008 | Thompson | 455/250.1 |
| 2008/0146281 A1 * | 6/2008 | Cohen et al. | 455/558 |

* cited by examiner

*Primary Examiner* — Iqbal Zaidi
(74) *Attorney, Agent, or Firm* — Withrow & Terranova, P.L.L.C.

(57) ABSTRACT

A user equipment (UE) antenna tuner control system and method that utilize a base transceiver station (BTS) inner power control loop, and in particular utilize a Node-B inner power control loop, are provided. The UE antenna tuner control system and method of the present disclosure include an antenna impedance matching algorithm and a power amplifier (PA) input drive control that are digitally controlled by the BTS. Therefore, each UE having a digitally controllable antenna tuner unit (ATU) and operating within a network that is controllable by the BTS will have increased power efficiency.

28 Claims, 56 Drawing Sheets

| TPC_CMD | TRANSMITTER POWER CONTROL RANGE | | | | | | | |
|---|---|---|---|---|---|---|---|---|
| | 1 dB STEP SIZE | | 2 dB STEP SIZE | | 3 dB STEP SIZE | | | |
| | LOWER | UPPER | LOWER | UPPER | LOWER | UPPER | | |
| +1 | +0.5 dB | +1.5 dB | +1 dB | +3 dB | +1.5 dB | +4.5 dB | | |
| 0 | -0.5 dB | +0.5 dB | -0.5 dB | +0.5 dB | -0.5 dB | +0.5 dB | | |
| -1 | -0.5 dB | -1.5 dB | -1 dB | -1 dB | -1.5 dB | -4.5 dB | | |

UE ANTENNA TUNER CONTROL VIA NODE-B INNER POWER CONTROL LOOP

RELATED APPLICATIONS

This application claims the benefit of provisional patent application Ser. No. 61/263,129, filed Nov. 20, 2009, the disclosure of which is hereby incorporated herein by reference in its entirety.

FIELD OF THE DISCLOSURE

The present disclosure relates to controlling the power of wireless communication devices that include variable antenna impedance matching circuitry and communicate with base transceiver stations (BTSs).

BACKGROUND

Antenna tuner units (ATUs) are employed in user equipment (UE) such as mobile terminals in order to maintain good link quality between base transceiver stations (BTSs) and the UE. In particular, an ATU is usable to match antenna input impedance with the output impedance of a power amplifier (PA). ATUs are especially useful when the UE is a mobile terminal communicating with a BTS, since the antenna of the mobile terminal can experience voltage standing wave ratio (VSWR) changes that may range from near 1:1 to 3.5:1 as the position of the antenna relative to the user's body changes. For example, antenna input impedance often experiences relatively large changes as portions of the user's body move within the near field of the antenna. These relatively large antenna input impedance changes typically result in a large reflected power, which limits the total radiated power (TRP) to less than a desired maximum amount of TRP.

Unreliable power control due to antenna impedance fluctuations is problematic for third generation (3G) and fourth generation (4G) UEs such as mobile terminals because standards for 3G and 4G UE include relatively strict power control accuracy constraints. What is needed is a UE antenna tuner control system and methods that utilize a BTS inner power control loop, and in particular utilize a Node-B inner power control loop.

SUMMARY

The present disclosure provides a user equipment (UE) antenna tuner control system and methods that utilize a base transceiver station (BTS) inner power control loop, and in particular utilize a Node-B inner power control loop. The UE antenna tuner control system and method of the present disclosure include an antenna impedance matching algorithm and a power amplifier (PA) input drive control that are digitally controlled by the BTS. Therefore, each UE having a digitally controllable antenna tuner unit (ATU) and operating within a network that is controllable by the BTS will have increased power efficiency.

The PA input drive control is for adjusting the power delivered by the PA. The antenna impedance matching algorithm is for determining the amount and direction of impedance change needed to provide an optimal impedance match between the PA and antenna that comprise the UE. The antenna impedance matching algorithm combined with the PA input drive control enables a convergence over time such that the ATU of the UE is optimally set to provide an increased delivered power.

One advantage of the UE antenna tuner system of the present disclosure is that additional power control loops beyond the inner power control loop are unnecessary. Since only the inner power control loop is needed, a possibility of loop instability due to interactivity between power control loops is eliminated. Moreover, by providing the inner power control loop with an ability to synchronize control of both the ATU and the power delivered by the PA, concerns about instability for continuous power transmission networks such as third generation (3G) and fourth generation (4G) networks are reduced.

Another advantage of the UE antenna tuner system of the present disclosure is that a directional coupler and a mismatch power detector are not needed as elements of the UE. As such, manufacturing costs of other power control and sensing circuitry on board the UE are reduced due to simplifications brought about by the elimination of the directional coupler and the mismatch power detector.

The elimination of the directional coupler and the mismatch power detector is made possible by measuring power delivered by the UE to the BTS based upon the inner power control loop's uplink and by measuring power delivered to the UE from the BTS based upon the inner power control loop's downlink. Both measurements of delivered power are usable by the antenna impedance matching algorithm to digitally tune the ATU of the UE such that the power delivered by the BTS and the power delivered by the UE are both optimized for a full duplex communication session in which a transmit (TX) frequency and a receive (RX) frequency for the full duplex communication session are different.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4 is a table listing a transmitter power control range for various TPC_cmd values transmitted with TPC commands.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Power control is implemented for code division multiple access (CDMA) and long term evolution (LTE) based cellular network systems. The primary goal of power control in such systems is to transmit signals in both an uplink direction and a downlink direction using the lowest possible power levels while maintaining a requested quality of service (QoS) for a user equipment (UE) in communication with a base transceiver station (BTS). However, determining appropriate transmitter levels for the uplink direction and the downlink direction is a sophisticated task due to a dynamic variation of the radio frequency (RF) environment between the UE and the BTS in communication. For example, a signal quality between the UE and the BTS can be affected in both directions by system level interference, reduced power available to the UE due to battery drain, and/or the mobility of the UE relative to the BTS.

Figure 1:
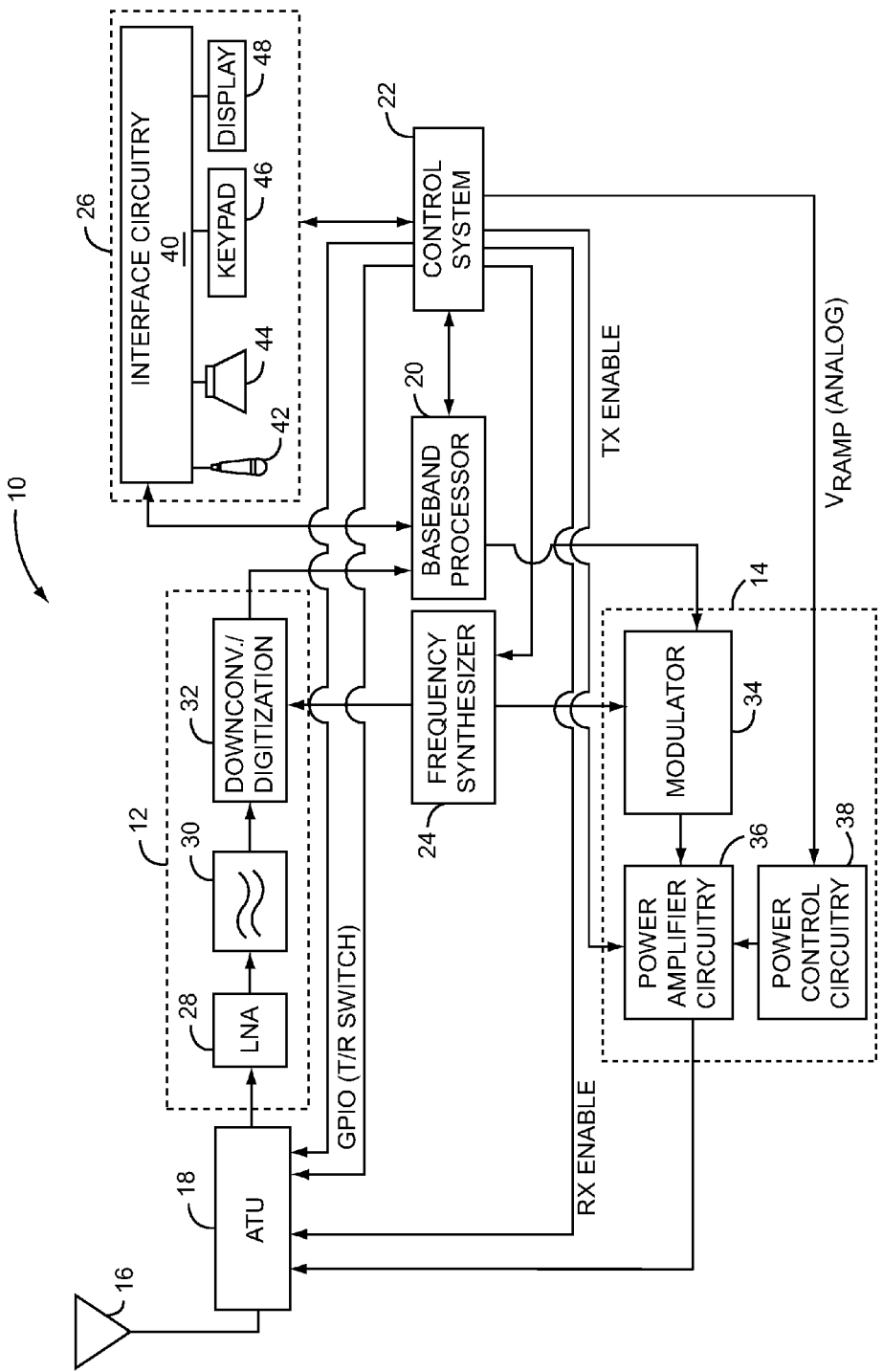
FIG. 1 is block diagram of a user equipment (UE) in the form of a mobile terminal that is usable with the UE antenna tuner system of the present disclosure.

FIG. 1 depicts a mobile terminal 10, such as a mobile telephone, personal digital assistant (PDA), personal computer, or the like, that makes up a UE of the present disclosure. The basic architecture of the mobile terminal 10 may include a receiver front end 12, an RF transmitter section 14, an antenna 16, an antenna tuner unit (ATU) 18, a baseband processor 20, a control system 22, a frequency synthesizer 24, and an interface 26.

The receiver front end 12 receives information-bearing RF signals from one or more remote transmitters provided by a BTS (not shown). The ATU 18 tunes the antenna 16 to enhance the reception of an RF signal captured by the antenna 16. A low noise amplifier (LNA) 28 amplifies the RF signal. A filter circuit 30 minimizes broadband interference in the RF signal, while a downconverter 32 downconverts the filtered, received RF signal to an intermediate or baseband frequency signal, which is then digitized into one or more digital streams. The receiver front end 12 typically uses one or more mixing frequencies generated by the frequency synthesizer 24.

The baseband processor 20 processes the digitized received signal to extract the information or data bits conveyed in the received signal. This processing typically comprises demodulation, decoding, and error correction operations. As such, the baseband processor 20 is generally implemented in one or more digital signal processors (DSPs).

On the transmit side, the baseband processor 20 receives digitized data, which it encodes for transmission, from the control system 22. The encoded data is output to the RF transmitter section 14, where it is used by a modulator 34 to modulate a carrier signal that is at a desired transmit frequency. PA circuitry 36 amplifies the modulated carrier signal to a level appropriate for transmission from the antenna 16. The power amplifier (PA) circuitry 36 provides gain for the signal to be transmitted under control of power control circuitry 38, which is preferably controlled by the control system 22 using an adjustable power control signal ($V_{RAMP}$). The ATU 18 tunes the antenna 16 to match the output impedance of the PA circuitry 36 to the input impedance of the antenna 16. In this way, the RF power of the modulated signal transmitted from the antenna 16 will be efficiently transmitted. The ATU 18 may be controlled by two digital general purpose input/output (GPIO) signals. One signal GPIO (T/R SWITCH) switches the ATU 18 between tuning the antenna 16 for transmission and reception. Another signal GPIO (ANT. TUNER) is usable to adjust tuning elements (not shown in FIG. 1) of the ATU 18.

The power control circuitry 38 adjusts the bias for the PA circuitry 36 to maintain a desired output power under varying conditions, such as decreasing battery voltage and/or fluctuating voltage standing wave ratio (VSWR), etc. The control system 22 may also provide a transmit enable signal (TX ENABLE) to effectively enable the PA circuitry 36 during periods of transmission.

A user may interact with the mobile terminal 10 via the interface 26, which may include interface circuitry 40 associated with a microphone 42, a speaker 44, a keypad 46, and a display 48. The interface circuitry 40 typically includes analog-to-digital converters, digital-to-analog converters, amplifiers, and the like. Additionally, the interface circuitry 40 may include a voice encoder/decoder, in which case it may communicate directly with the baseband processor 20.

The microphone 42 will typically convert audio input, such as the user's voice, into an electrical signal, which is then digitized and passed directly or indirectly to the baseband processor 20. Audio information encoded in the received signal is recovered by the baseband processor 20 and converted into an analog signal suitable for driving the speaker 44 and the interface circuitry 40. The keypad 46 and the display 48 enable the user to interact with the mobile terminal 10, inputting numbers to be dialed, address book information, or the like, as well as monitoring call progress information.

Figure 2:
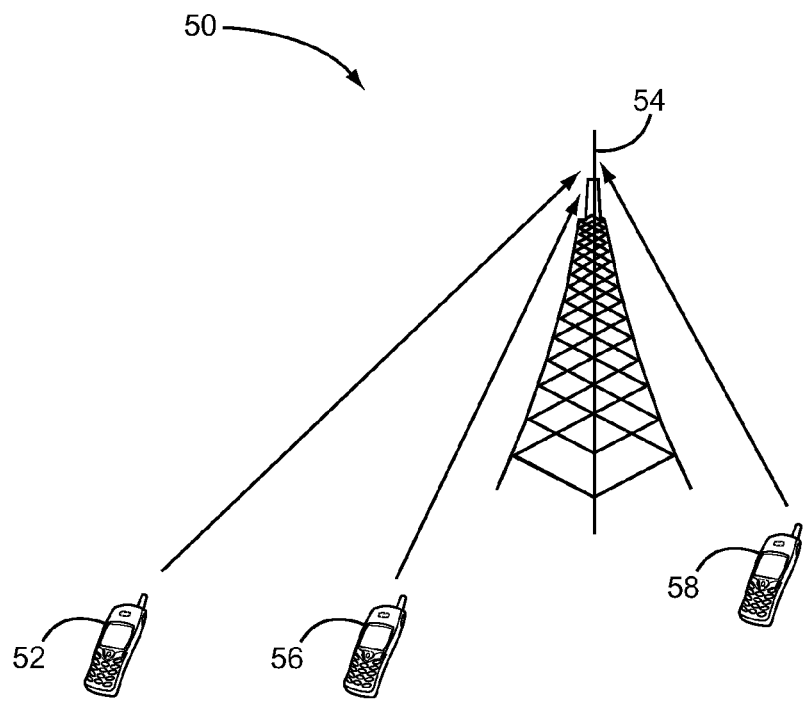
FIG. 2 is a diagram of a cellular network that is usable with the UE antenna tuner system of the present disclosure.

As illustrated in FIG. 2, a cellular network 50 experiences a near-far effect due to a UE 52 that is located far from a BTS 54, a UE 56 that is located at an intermediate distance from the BTS 54, and a UE 58 that is located near to the BTS 54. All signals transmitted from the UE 52, the UE 54, and the UE 56, and received by the BTS 54 would ideally have the same power level. However, if the UE 52, the UE 56, and the UE 58 each transmits at a power level that is appropriate for the nearby UE 58, the BTS 54 will potentially not be able to receive a usable signal level from the far-away UE 52. Alternately, if the nearby UE 58 transmits a signal at a power level appropriate for the far away UE 52, BTS 54 reception of signals transmitted from the intermediately distant UE 56 and the far away UE 52 will potentially by interrupted by interference from the signal transmitted from the nearby UE 58. This problem is known as the near-far effect. As a result of the near-far effect, users of the UE 52, the UE 56, the UE 58, and other UEs (not shown) cannot transmit signals at fixed power levels and expect reliable communication with the BTS 54 and other BTSs (not shown) that make up a modern cellular network, such as the cellular network 50. Various factors, such as fading variations and other signal-power variations caused by radio wave propagation physics contribute to the near-far effect.

Optimally efficient uplinks to the BTS 54 occur when the RF signal power from each of the UEs 52, 56, and 58 appears to be equal regardless of significant differences in range from the BTS 54 that exist for the UEs 52, 56, and 58. This equality in received signal strength provides for an optimal signal to interference ratio (SIR), which theoretically allows the BTS 54 to decode a maximum number of transmissions within the cellular network 50. However, in reality, a radio channel used for uplink to the BTS 54 is unstable. Therefore, RF signal power transmitted from the each of the UEs 52, 56, and 58 must be accurately and dynamically controlled.

Mature investigations pertaining to efficient RF signal power control have resulted in many RF signal power control algorithms that achieve efficient RF signal power control for uplinks from UEs such as the UEs 52, 56, and 58. Most of these traditional RF signal power control algorithms distribute the responsibility of RF signal power control to BTSs, such as the BTS 54. Traditionally, each BTS, such as the BTS 54, tracks and updates RF signal power levels received from UEs such as the UEs 52, 56, and 58.

In contrast, an optimally efficient downlink from the BTS 54 to the UEs 52, 56, and 58 must be handled differently. RF signals transmitted by the BTS 54 are orthogonal. RF signals that are mutually orthogonal do not in theory interfere with one another. However, it is difficult if not impossible to achieve complete orthogonality in typical communication environments for the cellular network 50. For example, RF signal reflections off of structures (not shown) within the cellular network 50 may cause non-orthogonal interference even in the case of a single BTS, such as the BTS 54. Moreover, RF signals transmitted from other BTSs, such as BTSs similar to the BTS 54 are non-orthogonal, and thus increase interference levels with the cellular network 50. Interference caused by RF signals that are non-orthogonal is particularly problematic for a CDMA system in which neighboring cells use an RF carrier signal of the same frequency. As a result of the interference caused by RF signals that are non-orthogonal, a power control for efficient downlink of RF signals is necessary.

Open loop power control and closed loop power are available for RF power control for downlink of RF signals. A UE, such as the UE 52, using open loop power control estimates an RF signal strength transmitted from the BTS 54 by measuring a received power level of the pilot signal of the BTS 54 in a downlink RF transmission from the BTS 54. The UE 52 then adjusts its RF power level to be inversely proportional to the received power level of the pilot signal of the BTS 54. Consequently, the UE 52 will transmit a relatively lower power RF signal in response to a relatively higher received power level of the pilot signal of the BTS 54. The responsiveness of open loop power control is relatively responsive. However, a problem exists in that the interference estimate made by the UE 52 is based upon the received power level of the pilot signal of the BTS 54, which can be of a different frequency than the frequency transmitted by the UE 52. This problem is particularly evident in the case of frequency division duplex (FDD), which uses uplink and downlink frequencies that are different by a duplex frequency offset. As a result, uplink and downlink fast fading on different RF signal carriers do not correlate, which results in less accurate power control based on averaging the received power level of the pilot signal of the BTS 54.

Nevertheless, open loop control achieves good results for universal mobile telecommunications system (UMTS) terrestrial radio access-time division duplex (UTRA-TDD) that uses a common frequency for both uplink and downlink. The good results for open loop control using a TDD mode are due to a strong correlation between the processing of fading for both the uplink and downlink RF signal transmissions. However, a wideband CDMA-frequency division duplex (WCDMA-FDD) system only uses open loop power control to provide an initial power setting of UEs, such as the UEs 52, 56, and 58, at the beginning of a communication session between the UEs 52, 56, and 58 and the BTS 54. An open loop power control tolerance is ±9 dB for normal environmental conditions for the cellular network 50, and ±12 dB for extreme environmental conditions for the cellular network 50.

Closed loop power control typically provides more accurate power control for UEs than open loop power control. In a typical closed loop power control technique, the BTS 54 makes use of uplink and downlink RF transmissions to measure the quality of the RF signals passed between the BTS 54 and the UEs 52, 56, and 58. The results of the quality measurement of the RF signals are sent from the BTS 54 to the UEs 52, 56, and 58 so that the UEs 52, 56, and 58 can adjust their respective RF signal power levels based upon the quality of the RF signals received by the BTS 54.

A UMTS terrestrial radio access-frequency division duplex (UTRA-FDD) mode of operation for the cellular network 50 uses a fast closed loop power control technique for both uplink and downlink RF signal transmissions. In the UTRA-FDD mode, a received SIR is measured over one UTRA-FDD time slot (TS), which has a duration of about 667 microseconds. For the uplink, a digital process algorithm executed by the BTS 54 determines whether or not to increase or decrease the power transmitted by any one of the UEs 52, 56, and 58.

A transmission power control (TPC) command having a TPC_cmd value with a number of transmit control bits is transmitted within each TS during an uplink or a downlink to individual ones of the UEs 52, 56, and 58 to convey commands for each of the UEs 52, 56, and 58 to either increase or decrease the power of their respective RF signal transmissions. For example, when the BTS 54 receives an RF signal from one of the UEs 52, 56, and 58, the BTS 54 will compare a measured signal level of the received RF signal with a threshold value that is predefined. If the measured RF signal level for the received RF signal exceeds the threshold value, the BTS 54 will send a decrease power TPC_cmd value to the UE 52. Alternately, the BTS 54 will send an increase power TPC_cmd value to the UE 52 if the measured RF signal level is lower than the threshold level.

During downlink transmissions, the UEs 52, 56, and 58 will report received RF signal levels for RF signals transmitted from the BTS 54. The digital process algorithm executed by the BTS 54 uses received RF signal level reports from the UEs 52, 56, and 58 to determine when the RF signal power of the BTS 54 needs an increase or decrease to maintain high quality communication between the individual ones of the UEs 52, 56, and 58 and the BTS 54.

Figure 3:
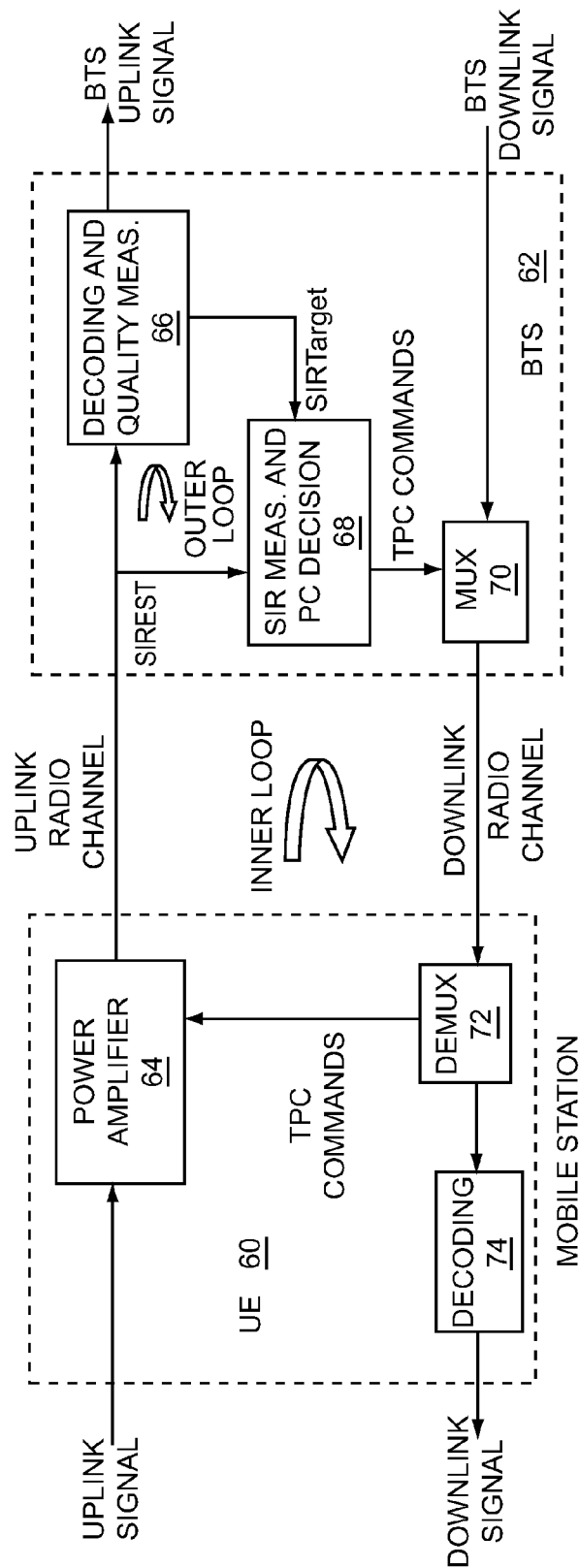
FIG. 3 is a block diagram illustrating the power control interaction between a base transceiver station (BTS) and a UE.

FIG. 3 illustrates closed loop power control between a UE 60 and a BTS 62. The UE 60 includes a PA 64 that amplifies a UE UPLINK SIGNAL and outputs the amplified UE UPLINK SIGNAL over an UPLINK RADIO CHANNEL. The UE UPLINK SIGNAL transmitted over the UPLINK RADIO CHANNEL is received by a decoding and quality measurement function 66 that is a first function block that is usable for decoding the UE UPLINK SIGNAL and making quality measurements of the UE UPLINK SIGNAL. The decoding and quality measurement function 66 also outputs a BTS UPLINK SIGNAL, which is a decoded version of the UE UPLINK SIGNAL. The decoding and quality measurement function 66 also outputs an SIR Target value that is received by an SIR measurement and power control (PC) decision function 68, which is a second function block that performs SIR measurements and PC determinations to output TPC commands that are multiplexed with a BTS DOWNLINK SIGNAL via a multiplexer (MUX) 70. The SIR measurement and PC decision function 68 also receives SIR estimates (SIREST) included in the UE UPLINK SIGNAL. Interaction between the decoding and quality measurement function 66 and the SIR measurement and PC decision function 68 make up an OUTER LOOP.

The TPC commands multiplexed with the BTS DOWNLINK SIGNAL are transmitted over a DOWNLINK RADIO CHANNEL to be received by a demultiplexer (DEMUX) 72. The DEMUX 72 separates the BTS DOWNLINK SIGNAL from the TPC commands, sending the latter to control the PA 64 and sending the former to a decoding function block 74 that decodes the BTS DOWNLINK SIGNAL to output a UE DOWNLINK SIGNAL. An information exchange comprising SIREST and TPC commands between the UE 60 and the BTS 62 make up an INNER LOOP. The INNER LOOP allows control loop power adjustments that maintain transmitted RF power levels from the UE 60 that will keep the received SIR estimates substantially equal to the SIR Target value. The power control frequency of the INNER LOOP is 1500 Hz in order to provide timely power adjustments.

If the SIR Target value results in a low quality bit stream carried by the UE UPLINK SIGNAL over the UPLINK RADIO CHANNEL, then the SIR Target value should be increased. The SIR Target value is fixed based upon a block error ratio (BLER) or bit error ratio (BER). The SIR Target value is set by the OUTER LOOP in order to match a required BLER. An optimal SIR Target depends on the speed of the UE 60 towards or away from the BTS 62 as the UE 60 traverses a multipath profile. Thus, the OUTER LOOP is usable to maintain the quality of communications at the level of a bearer service quality requirement, while transmitting as low a level as possible from both the UE 60 and the BTS 62. The OUTER LOOP is also responsible for setting the SIR Target at the BTS 62 for each individual uplink under the power control of the INNER LOOP. The SIR Target is updated for each UE, such as the UE 60 according to an SIREST uplink quality that preferably include BLER and/or BER measurements for each Radio Resource Control (RRC) connection. The RRC connection is responsible for controlling the configuration of UMTS radio interface Layers 1 and 2. The OUTER LOOP also provides for a downlink power control that allows a receiver of the UE 60 to converge to a required BLER that is set by a Radio Network Controller (RNC).

As shown in the table of FIG. 4, a transmitter of the UE 60 is typically adapted to change the output power transmitted by the UE 60 in step sizes of 1 dB, 2 dB and 3 dB. Changes in the output power provided by the BTS 62 occur during TSs that immediately follows a TPC command.

A first algorithm ALGORITHM1 for power control using the INNER LOOP requests a transmit power decrease if the SIREST is greater than the SIR Target. In contrast, the first algorithm for power control using the INNER LOOP requests a transmit power increase if the SIREST is less than the SIR Target. It is to be understood that a change in the transmitter output power for a UE such as the UE 60 is made in response to a single TPC command via a TPC_cmd value.

A second algorithm ALGORITHM2 for power control only updates every fifth TS in order to simulate smaller power update steps relative to the update steps of the ALGORITHM1. The transmit power of the UE 60 is reduced by 1 dB if five TPC commands in a row have a TPC_cmd value requesting a power decrease. In contrast, the transmit power of the UE 60 is increased by 1 dB if five TPC commands in a row have a TPC_cmd value requesting a power increase. If no power increase or decrease is requested, the transmit power of the UE 60 will remain unchanged.

The transmit power of the DOWNLINK RADIO CHANNEL (FIG. 3) for the UE 60 is determined by the cellular network 50 (FIG. 2). A power control step size can have four values, which are typically 0.5 db, 1 dB, 1.5 dB, and 2 dB. However, regulations for a UMTS terrestrial radio access network (UTRAN) only mandate support for a 1 dB power control step size. Support for other power control step sizes is optional.

The UE 60 generates TPC commands to control the transmit power of the BTS 62. The UE 60 transmits the TPC commands to the BTS 62 in a TPC field of an uplink dedicated physical control channel (DPCCH). The BTS 62 adjusts the downlink power of the DPCCH and the dedicated physical data channel (DPDCH) upon receiving the TPC commands from the UE 60.

In a soft handover state in which the UE 60 is traveling between cells of a cellular network such as the cellular network 50 (FIG. 2), the transmit power of the UE 60 is adjusted by selecting the most suitable TPC command received from various BTSs, such as the BTS 62. In a case in which the UE 60 has simultaneous radio links with other BTSs besides the BTS 62, the UE 60 will receive more than one TPC command from the other BTSs independently. The received TPC commands may provide conflicting power control instructions to the UE 60. A basic approach to resolving the conflicting power control instructions is for the UE 60 to comply with the TPC command that calls for the least amount of transmit power.

A site selection diversity technique (SSDT) is another approach to resolving TPC command conflicts. The basic principle of SSDT is that the BTS with the highest signal level is dynamically selected by the UE 60 to be the only transmitting BTS. As a result, any other BTSs that have simultaneous radio links to the UE 60 will cease their DPDCH transmissions. As a result, the transmit power of the UE 60 will be adjusted based upon the TPC commands of the BTS with the highest signal level as determined by the UE 60.

During an inter-frequency handover from the BTS 62 to another BTS, the UE 60 must be given time to make the necessary measurements on the different WCDMA carrier frequency. In this compressed mode, the transmissions of the BTS 62 and the UE 60 are ceased for a predefined period to provide enough time for inter-frequency measurements. As a result, the adjustments of transmit power for both the UE 60 and the BTS 62 are problematically halted. In order to resolve this problem during uplink, the UE 60 is allowed to increase or decrease transmit power using step sizes that are larger than typically called for in order to reach a desired SIR Target as swiftly as possible.

Figure 5A:
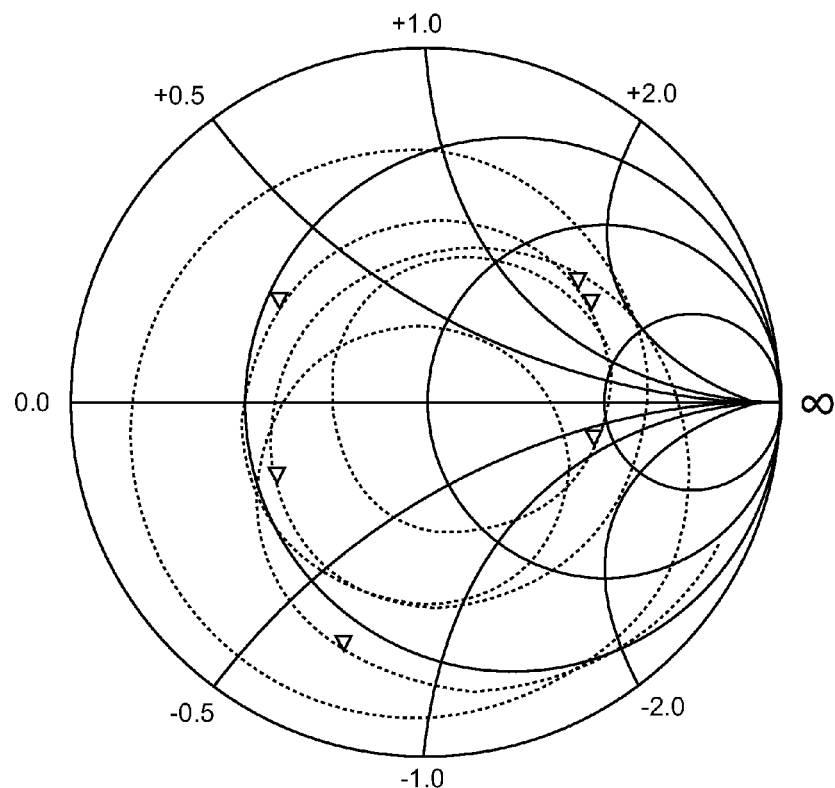
FIG. 5A is a Smith chart that shows the impedance of the antenna relative to a reference plane for two different input impedance conditions.
Figure 5B:
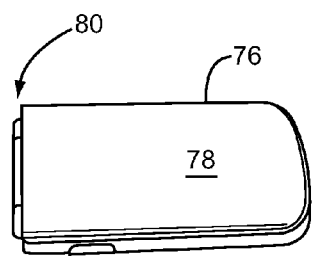
FIG. 5B depicts a UE in a flip phone form in a closed position.
Figure 5C:
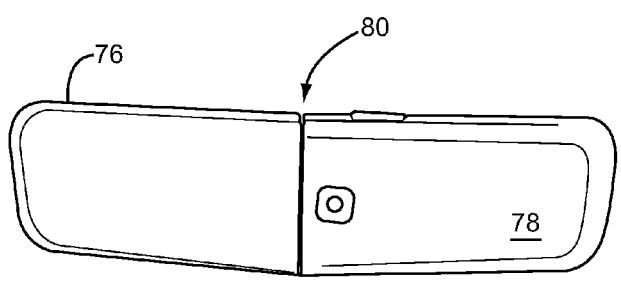
FIG. 5C depicts the UE of FIG. 5B in an open position.

While power control of the UE 60 and the BTS 62 using the power control algorithms described above are relatively well developed, problems remain in that factors other than power levels that affect signal quality are present during a typical communication session between the UE 60 and the BTS 62. For example, as illustrated in FIGS. 5A, 5B, and 5C, a VSWR variation seen for an antenna 76 of a UE 78 in a flip phone form typically ranges from about 1:1 to about 6:1. The Smith chart of FIG. 5A shows the impedance of the antenna 76 relative to a reference plane 80 (FIGS. 5B and 5C). An impedance mismatch for the antenna 76 caused by a non-50 ohm impedance generates an impedance mismatch loss. The mismatch loss can be as high as 3 dB for a VSWR of 6:1. Due to such a high loss, the power transmitted by the UE 78 is degraded and the received signal level at a BTS such as the BTS 62 (FIG. 3) is reduced. Other problems caused by the impedance mismatch loss include an increased noise figure and reduced battery life for the UE 78.

Figure 6:
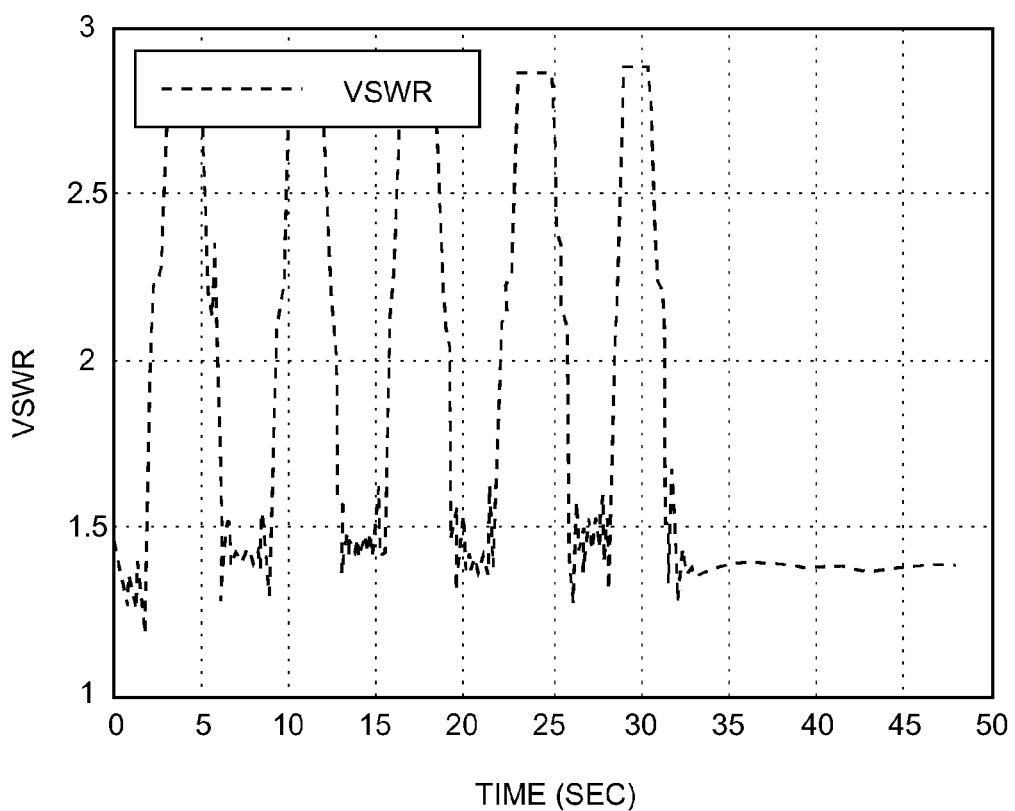
FIG. 6 is a graph of voltage standing wave ratio (VSWR) versus time for the antenna of a UE that is alternately placed onto and picked up off a table.
Figure 7:
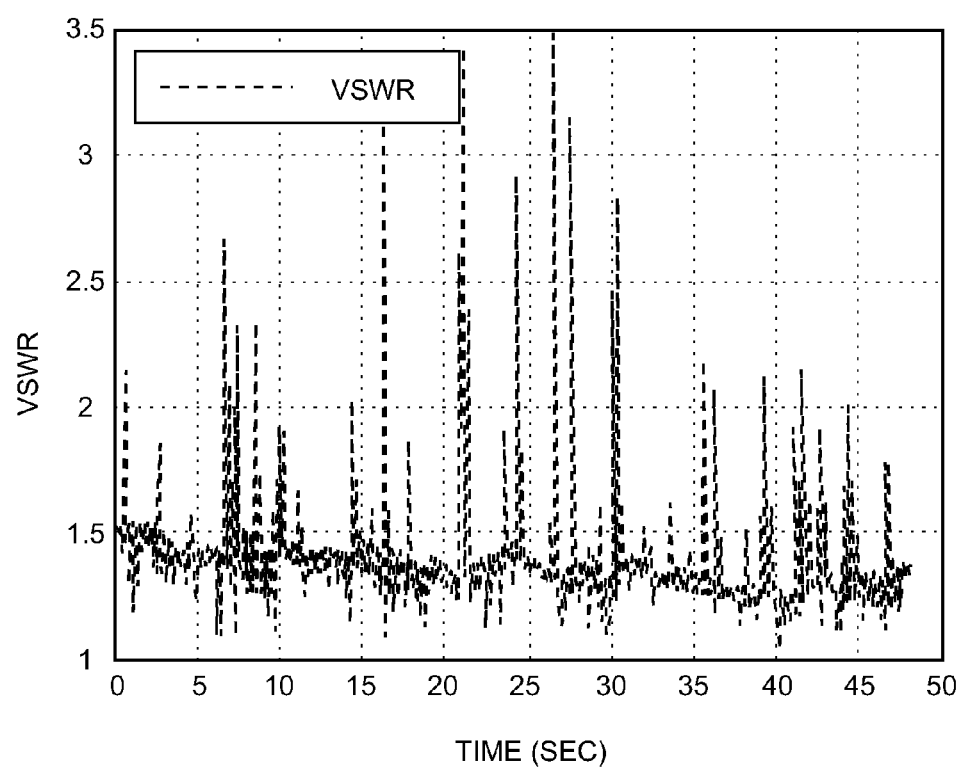
FIG. 7 is a graph of VSWR versus time for the antenna of a UE that has a rapidly changing VSWR caused by a user's fingers moving rapidly about the antenna.

Relatively large VSWR changes can be seen at the antenna 76 depending on how a user handles the UE 78. FIGS. 6 and 7 illustrate two examples of how the VSWR for the antenna 76 is affected by user handling. FIG. 6 is a graph of VSWR versus time for low band 900 MHz transmission from the antenna 76. In the example of FIG. 6, the UE 78 of FIGS. 5A, 5B, and 5C was alternately lifted from and placed onto a table five times. Notice that the VSWR for the antenna 76 changes from around 1:1.4 when the UE 78 is off of the table to around 1:2.8 when the UE 78 is on the table. In the example of FIG. 7, the fingers of a user were rapidly moved about the antenna 76. Notice that the VSWR is seen to change rapidly at a rate that is around 200 milliseconds.

The problem of relatively large VSWR changes is becoming more challenging as advances in cellular networks are requiring the support of larger bandwidth ranges within a single UE, such as the UE 78 (FIGS. 5B and 5C). For example, the preferred bandwidth range to be supported will cover 700 MHz through 2600 MHz for a single UE, such as the UE 78. Note that even with such a wide bandwidth range, antenna efficiency and radiated gain must remain within ranges that provide reliable communication between BTSs and UEs.

Figure 8:
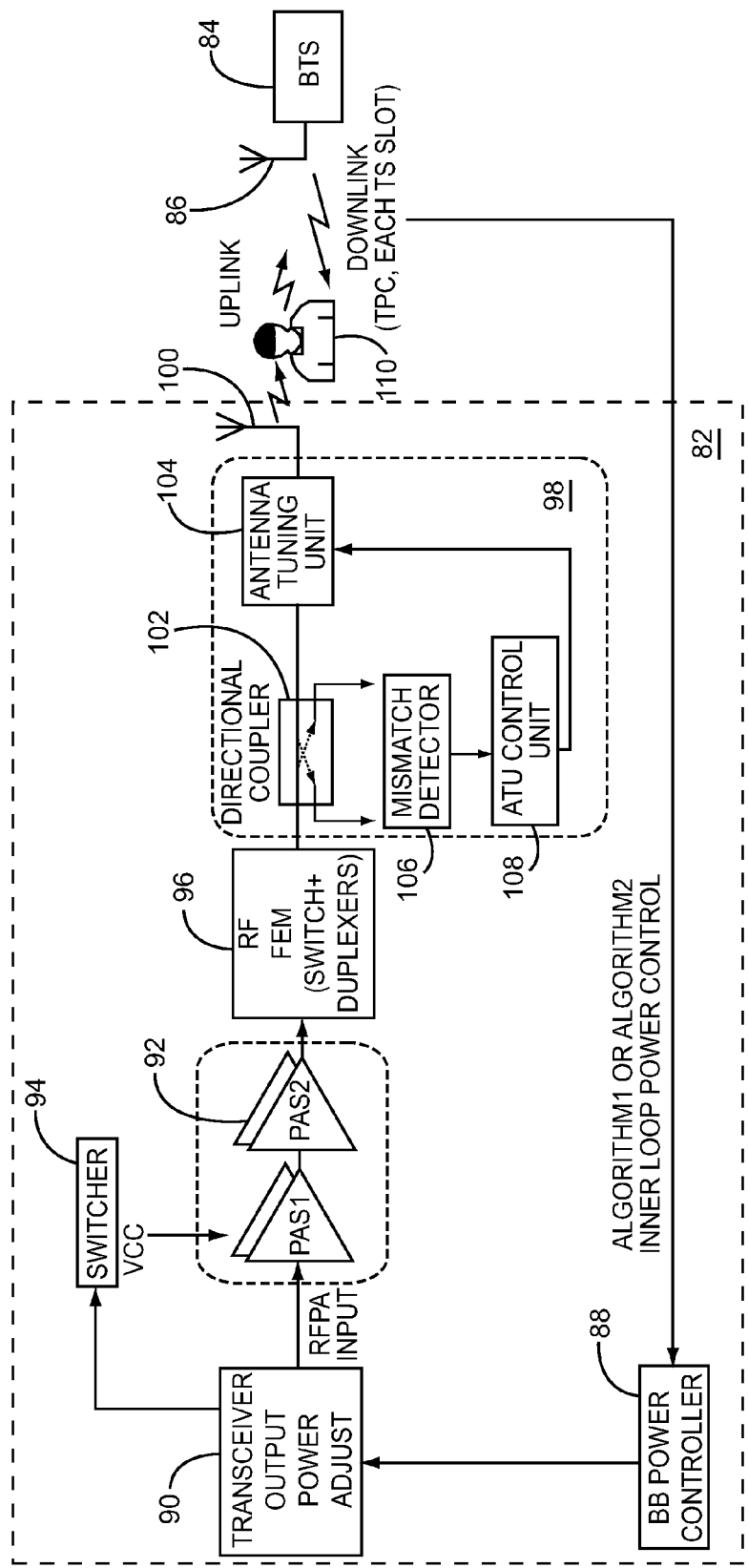
FIG. 8 is a block diagram of a prior art communication system that includes a prior art UE that incorporates an automatic antenna tuning system.

In order to counter the problems caused by antenna impedance mismatches, most antenna tuning techniques incorporate an ATU and a baseband (BB) power controller that both reside within a UE. FIG. 8 is a block diagram of a UE 82 according to the prior art. The UE 82 is in communication with a BTS 84 having a BTS antenna 86. The UE 82 includes a BB power controller 88 for controlling a transceiver output power adjusting function 90. The BB power controller 88 sends a signal to the transceiver output power adjusting function 90 based on downlink TPC commands received from the BTS 84. In turn, the transceiver output power adjusting function 90 controls the amount of output voltage and/or bias current that is delivered to a PA 92 from a switcher power supply 94. The PA 92 includes power amplifier stages (PASs) PAS1 and PAS2. An amplified RF signal output from the PA 92 is directed through an RF front end module (FEM) 96 to an automatic antenna tuning system 98 that is coupled to a UE antenna 100.

The automatic antenna tuning system 98 is made up of a directional coupler 102 that passes the majority of an amplified RF signal into an ATU 104 while directing a sample of the amplified RF signal into a mismatch detector 106. An ATU control unit 108 receives a mismatch signal from the mismatch detector 106. The ATU control unit 108 uses the mismatch signal to adjust a matching network of the ATU 104 to generate a mismatch correction signal that automatically optimizes an impedance match between the UE antenna 100, the FEM 96, and the PA 92. In this way, there will be a reduced negative impact on the transmission performance of the UE 82 as a user 110 inadvertently changes the VSWR of the UE antenna 100 during operation of the UE 82. However, it is important to note that the automatic antenna tuning system 98 is independent of an inner loop power control such as used with the INNER LOOP between the UE 60 and the BTS 62 of FIG. 3. While a certain amount of independence is positive in some control systems, the opposite is true in this case because the automatic antenna tuning system 98 is relatively slow compared to an inner loop power control for 3G and 4G continuous transmission systems that have TS periods of around 0.667 milliseconds. Further still, the automatic antenna tuning system 98 relies on the directional coupler 102, the mismatch detector 106, and the ATU control unit 108, all of which add to the design and production costs of the UE 82.

An example of potential network degradation due to the independence of the automatic antenna tuning system 98 can be demonstrated with the following scenario. In reference to FIG. 8, assume a VSWR changes at the UE antenna 100 from 1:1 to 2.5:1. As a result, the BTS 84 will see a change of about −1 dB in the power delivered by the UE 82. Further, assume that the VSWR change starts at a TS boundary of 0.667 ms. Also assume that the response of the automatic antenna tuning system 98 is slower than 0.667 ms, and assume that a convergence algorithm of the antenna tuning takes about 0.677 ms to measure the change of VSWR to find an optimum adjustment for the matching network. Meanwhile, the inner loop power control will request that the UE 82 increase its output power by +1 dB via a TPC equals up command. However, the automatic antenna tuning system 98 will independently apply its correction to the matching network of the ATU 104, which results in a change of about +1 dB. The UE 82 also will apply a power change of +1 dB, thus resulting in a +2 dB change of delivered power increase versus the previous TS. Such action will result in a lack of accuracy necessary for reliable communication between the UE 82 and the BTS 84. Worse, there is a potential for creating instabilities of the inner power control loop.

Another potential problem pertains to a degradation of the detection of an impedance mismatch. Such a problem can be created by the presence of a near-by transmitter that leaks an interference signal into the UE antenna 100. The interference signal may superimpose onto an internally reflected signal that needs to be measured due to a load mismatch at the UE antenna 100. The superimposing interference signal would likely lead to erroneous impedance mismatch correction attempts by the automatic antenna tuning system 98.

The present disclosure provides solutions for the above described problems associated with prior art antenna tuning techniques. In particular, the present disclosure provides a novel antenna tuning control scheme that adds an antenna control algorithm ALGORITHM3 to an inner loop power control similar to that used with the INNER LOOP between the UE 60 and the BTS 62 of FIG. 3.

Figures 9A, 9B:
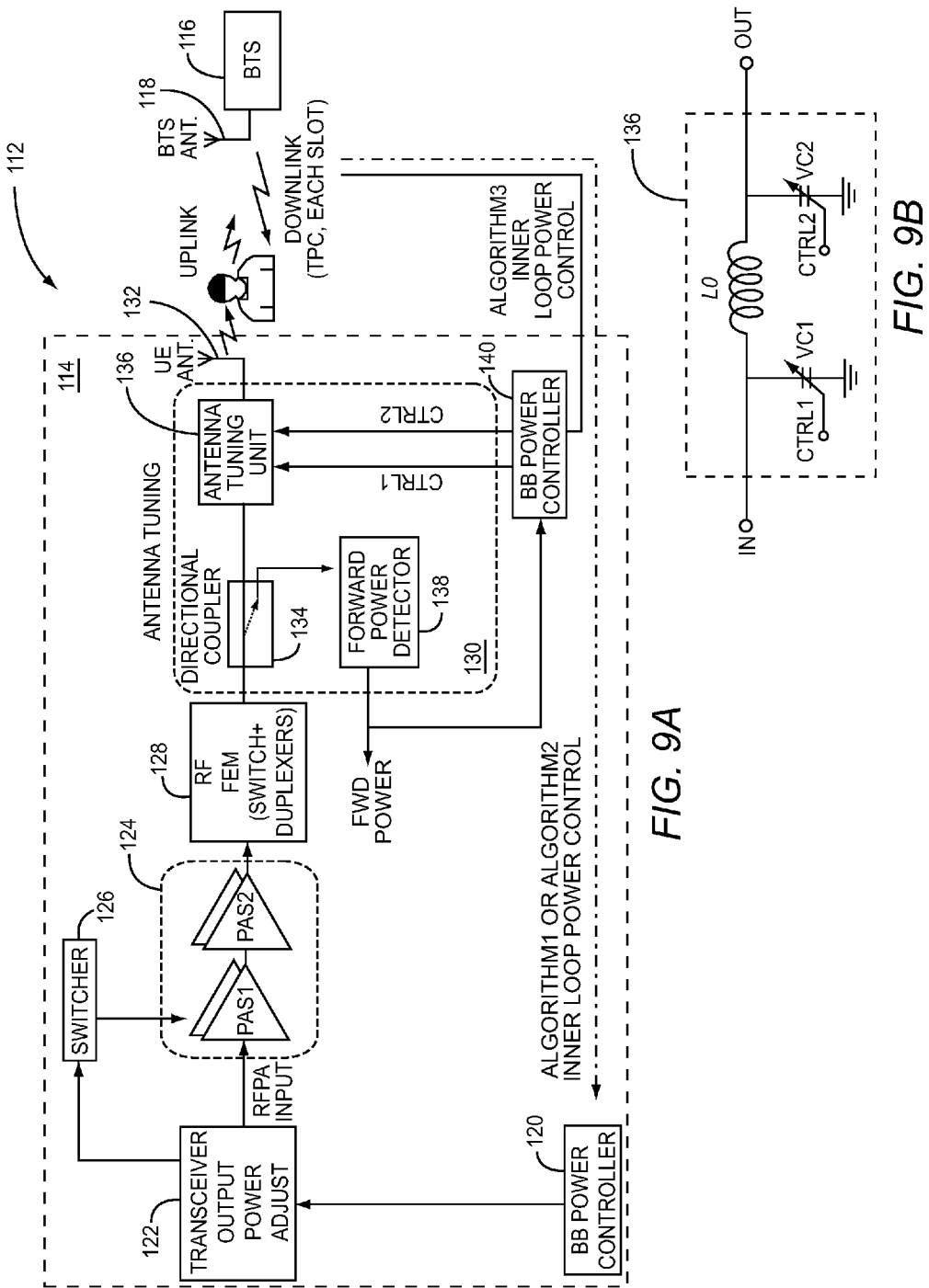
FIG. 9A is a block diagram of a communication system and a UE that is in accordance with the present disclosure.
FIG. 9B is a diagram of a digitally controlled impedance matching circuit that comprises an antenna tuner unit (ATU) of the UE of the present disclosure.

Turning now to FIG. 9A, a communication system 112 and a UE 114 that is in accordance with the present disclosure are illustrated. The UE 114 is in communication with a BTS 116 having a BTS antenna 118. The UE 114 includes a first baseband (BB) power controller 120 for controlling a transceiver output power adjusting function 122. The first BB power controller 120 sends a signal to the transceiver output power adjusting function 122 based on downlink TPC commands received from the BTS 116, which applies the ALGORITHM1 or the ALGORITHM2. In turn, the transceiver output power adjusting function 122 controls the amount of output voltage and/or bias current that is delivered to a PA 124 from a switcher power supply 126. An amplified RF signal output from the PA 124 is directed through an RF FEM 128 to an automatic antenna tuning system 130 that is coupled to a UE antenna 132.

The automatic antenna tuning system 130 includes a forward power coupler 134 that passes the majority of an amplified RF signal into an ATU 136 while directing a sample of the amplified RF signal into a forward power detector 138. A second BB power controller 140 receives an output of the forward power detector 138 along with an input from the ALGORITHM3. The second BB power controller 140 outputs a pair of ATU control signals CTRL1 and CTRL2, which are based on inputs from the ALGORITHM3 along with an output of the forward power detector 138. As shown in FIG. 9B, the ATU control signals CTRL1 and CTRL2 adjust variable capacitors VC1 and VC2 that make up the ATU 136. An inductor L0 is coupled to the variable capacitors VC1 and VC2 in a PI network configuration.

In operation, the only power measurement made by the UE 114 is a forward power measurement that is similar to the forward power measurements conducted by most 3G and 4G applications. The forward power measurement is used as a control input into the second BB power controller 140 so that the second BB power controller 140 can avoid exceeding a predetermined maximum power limit. The forward power measurement is reported to the BTS 116.

During operation, the ALGORITHM1 and/or the ALGORITHM2 are used by the INNER LOOP POWER CONTROL to adjust the output power of the UE 114 via the transceiver output power adjusting function 122. The UE 114 informs the BTS 116 of a maximum forward power limit if the output power of the PA 124 as detected via the forward power detector 138 reaches a maximum output power. If the maximum forward power limit has been reached, the BTS 116 will command the UE 114 to switch to the ALGORITHM3 INNER LOOP POWER CONTROL mode.

At this point in time, the BTS 116 remains in communication with the UE 114 via the TPC commands. However, while processing the ALGORITHM3, the UE 114 will use the TPC commands to adjust the antenna tuning control, while maintaining constant forward output power for the PA 124. The TPC commands received by the second BB power controller 140 in the form of "Up" and "Down" power control messages and used for inner power loop control are preferably in accordance with high speed packet access (HSPA) standards and/or long term evolution (LTE) standards. If a TPC command is "Up," the antenna tuning is adjusted in a random direction. The change in the antenna tuning will either increase the delivered output power by reducing the reflected power from an antenna mismatch or will decrease the delivered output power by inadvertently increasing the reflected power due to the antenna mismatch. If the BTS 116 sees that the output power of the UE 114 has decreased instead of increasing, the BTS 116 will command the UE 114 to increase output power via the TPC command set as "Up." However, the BTS 116 will also indicate that the direction of the antenna tuning control must be changed on the next TS. Thus, on the next TS, the antenna tuning control would be set on the right direction to result in an increased delivered power by reducing the reflected power due to the antenna mismatch. If the BTS 116 determines that the delivered power is still below a predetermined target, the BTS 116 will continue sending the TPC command for "Up" until the measured power at the BTS 116 meets the predetermined target.

Once the BTS 116 verifies that the delivered power for the UE 114 meets the predetermined target, the BTS 116 will command the UE 114 to switch back to ALGORITHM1 or ALGORITHM2, and thus to stop operating in ALGORITHM3 INNER LOOP POWER CONTROL mode. In this way, the antenna tuning setting commanded by the BTS 116 may not have reach an optimum setting, but at least the current setting increases the delivered power by the UE 114 to an amount commanded by the BTS 116.

If the output of the UE 114 decreases after a previous increase, the BTS 116 will command the UE 114 to cease operating the ALGORITHM3 during a subsequent TS. This case is due to the limited range of the antenna tuning for the given VSWR at which the antenna is operating. A previous antenna control value will be maintained by the second BB power controller 140 after the ALGORITHM3 ceases.

It is important to note that during the execution of the ALGORITHM3, the UE 114 will provide power steps on each TS, but will not meet the relative gain accuracy requirements, since the antenna tuning control cannot precisely predict the gain changes. However, no gain inaccuracy problem is created because the UE 114 is usually far enough away from the BTS 116 that a request by the BTS 116 for more output power from the UE 114 will not be impacted by the near-far effect.

The power delivered (Pdel) by the UE 114 is estimated by taking the difference between the forward power (Pfwd) and the reverse power (Prev). Therefore, the Pdel=Pfwd−Prev=Pfwd*$(1-|\Gamma|^2)$ where $\Gamma$ is the reflection coefficient, and $\Gamma$ is function of the antenna load and the antenna control settings for the variable capacitor VC1 and the variable capacitor VC2 (FIG. 9B).

The ALGORITHM3 controls the antenna tuning such that the ATU 136 is adjusted to provide an increase of the power delivered by the UE 114. An unknown step value may be used to change the antenna control settings for the variable capacitor VC1 and the variable capacitor VC2. However, the PI filter configuration made up of VC1, VC2 and L0 is preferably implemented such that an unknown step does not exceed a predetermined limit such as will result in a 1 dB change. While this constraint might not necessarily provide the optimum matching settings that maximize the delivered power from the UE 114 for an individual TS, it is sufficient to increase the delivered power during a given TS.

As the ALGORITHM3 continues to issue TPC commands over subsequent TSs, the antenna tuning is again slightly adjusted such that the delivered power from the UE 114 is increased. In this way, the antenna tuning provided by ALGORITHM3 will converge to optimum settings for the variable capacitor VC1 and the variable capacitor VC2 over several TSs. The latest variable capacitor VC1 and variable capacitor VC2 set are preferably maintained after the BTS 116 commands the UE 114 to operate in the ALGORITHM1 or ALGORITHM2 modes where the output power control is implemented by adjusting the drive input level of the PA 124 using the transceiver output power adjusting function 122.

ALGORITHM1 and ALGORITHM2 are usable with the inner loop power control to adjust a forward power output of the PA 124 with a relatively precise gain step. In comparison, the ALGORITHM3 is usable with the inner loop power control to reduce reverse power by adjusting the ATU 136. Advantageously, no precise gain step is required for the ALGORITHM3 in order to increase UE power delivered to the BTS 116. Moreover, the ALGORITHM3 reduces a typical need to over-design the PA 124 to make up for reverse power losses.

Figure 10A:
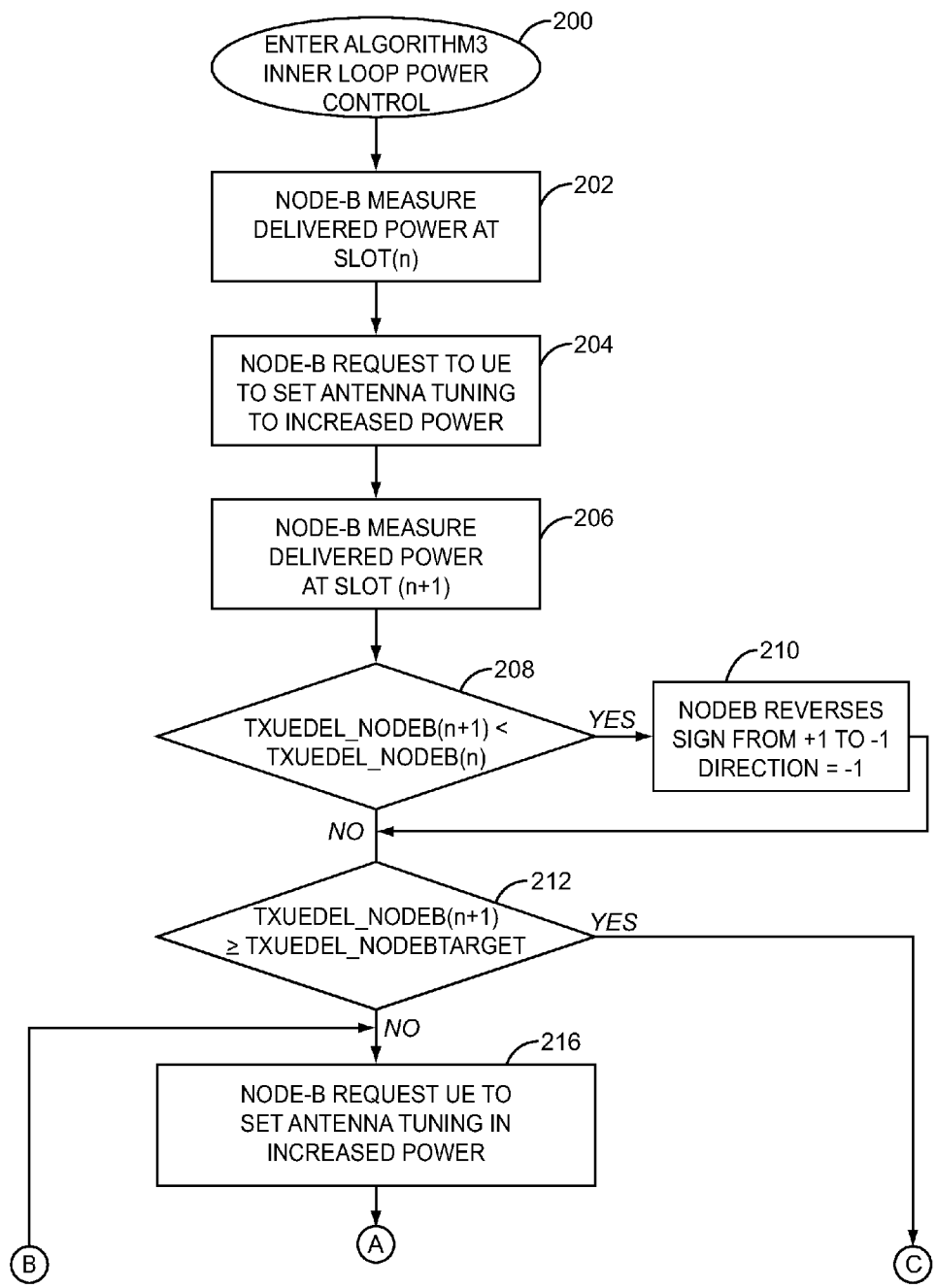
FIG. 10A is a flowchart depicting a third algorithm ALGO-RITHM3 that is in accordance with the present disclosure.
Figure 10B:
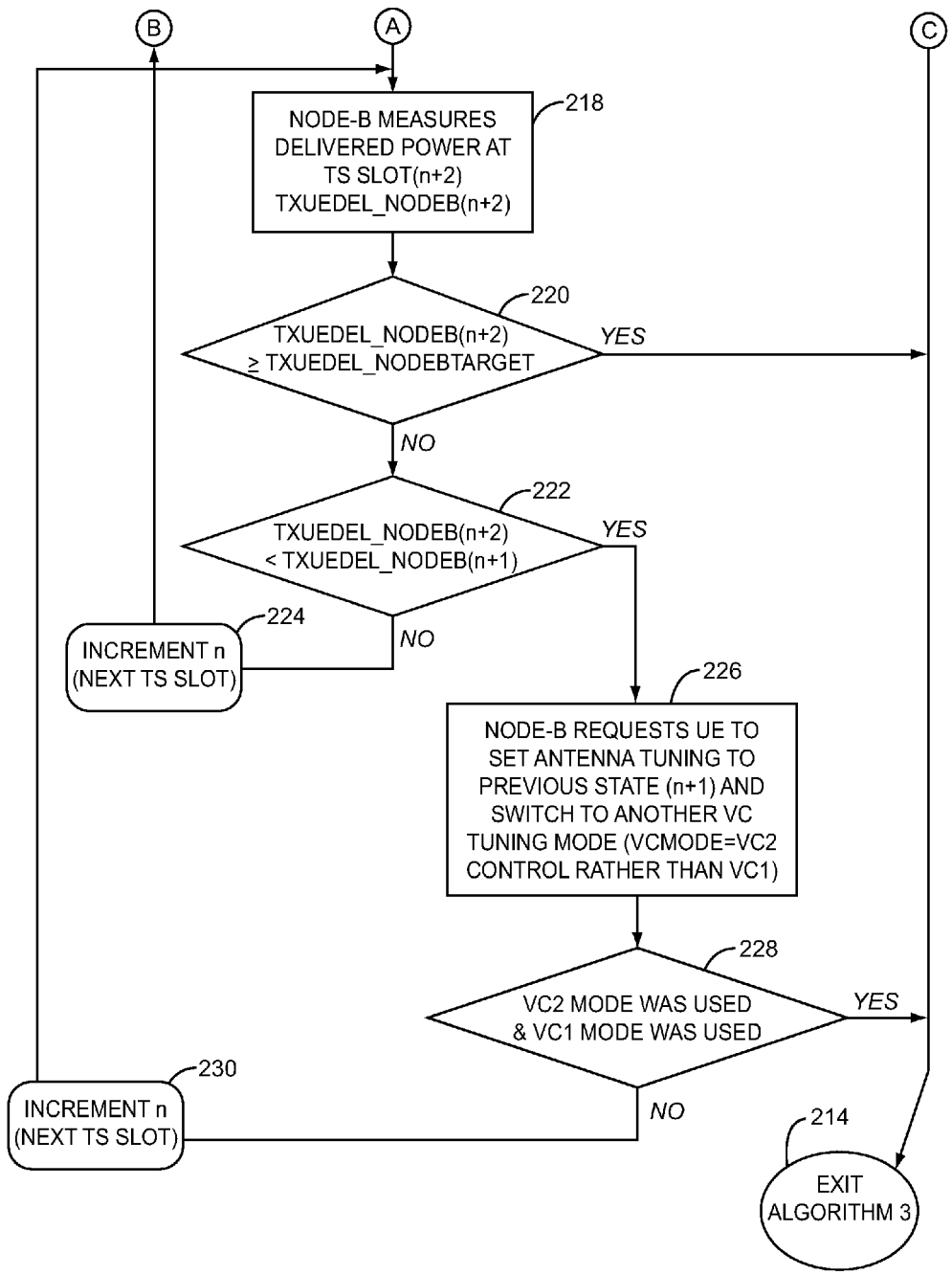
FIG. 10B is a continuation of the flow chart of FIG. 10A.

FIGS. 10A and 10B illustrate a high-level overview of one embodiment of the ALGORITHM3 for controlling the ATU 136. In this example, a BTS such as the BTS 116 (FIG. 9A) is referred to as a Node-B. If a UE such as the UE 114 reports to a Node-B that a power transmit level for the UE is at a maximum level and the UE power delivered to the Node-B is less than a desired amount, the ALGORITHM3 will be entered (step 200). The Node-B will then measure the UE delivered power at TS SLOT(n) (step 202). Next, the Node-B will request that the UE tune an ATU such as the ATU 136 in an attempt to increase output power delivered to the Node-B (step 204). The Node-B will then measure the UE delivered power at TS SLOT(n+1) (step 206). The Node-B then determines if the UE delivered power at the new TS (TXUEDEL_NODEB(n+1)) is less than the UE delivered power for the previous TS (TXUEDEL_NODEB(n)) (step 208). If the Node-B determines that the UE delivered power has decreased, the Node-B reverses a tuning direction sign from +1 to −1 so that a subsequent attempt to increase output power delivered to the Node-B will be successful (step 210).

The Node-B also determines if the UE delivered power to Node-B for the new TS (TXUEDEL_NODE(n+1) is greater than or equal to a target power level (TXUEDEL_NODEBTARGET) (step 212). If the UE delivered power to Node-B for the new TS is greater than or equal to the target power level, the ALGORITHM3 will be exited (step 214). However, if the UE delivered power to Node-B for the new TS is less than the target power level, the Node-B will request that the UE tune the ATU in an attempt to increase output power delivered to the Node-B (step 216).

The Node-B will then measure the UE delivered power at TS SLOT(n+2) (step 218). The Node-B then determines if the UE delivered power to the Node-B for the new TS (TXUEDEL_NODEB(n+2)) is greater than or equal to a target power level (TXUEDEL_NODEBTARGET) (step 220). If the UE delivered power to Node-B for the new TS is greater than or equal to the target power level, the ALGORITHM3 will be exited (step 214). However, if the UE delivered power to Node-B for the new TS is less than the target power level, the Node-B then determines if the UE delivered power at the new TS (TXUEDEL_NODEB(n+2)) is less than the UE delivered power for the previous TS (TXUEDEL_NODEB(n+1)) (step 222). If the UE delivered power to the Node-B for the new TS is not less than the UE delivered power for the previous TS, the new TS is incremented to the next TS (step 224).

Alternately, if the UE delivered power to Node-B for the new TS is less than the UE delivered power for the previous TS, the Node-B sends a request to the UE to tune the ATU back to a previous state (i.e., the tuning settings at the n+1 state), and to switch to another VC tuning mode (VCMODE) (step 226). For example, a variable capacitor VC2 is a tuning element for the tuning mode VCMODE=VC2, while a variable capacitor VC1 is a tuning element for the tuning mode VCMODE=VC1.

Next, the UE determines if both tuning modes have been exhausted (step 228). If the UE determines that both tuning modes have not been exhausted, the new TS is incremented to the next TS (step 230). Alternately, if the UE determines that both tuning modes have been exhausted, the ALGORITHM3 is exited (step 214).

System simulations of the ALGORITHM3 may be performed using a numerical computing environment and 4G programming language adapted to simulate antenna tuning with the PI filter of FIG. 9B, where the variable capacitor VC1 and the variable capacitor VC2 are controlled sequentially via the BTS 116 (FIG. 9A). Each iteration of a plurality of iterations needed for a simulation of the ALGORITHM3 corresponds to one TS period.

Several system simulations of the ALGORITHM3 may be performed for various Smith chart locations of an antenna load. The normalized real part of the antenna load is <1 or >1. Similarly, the normalized imaginary part is <1 or >1. Note that simulations of the ALGORITHM3 do not include a time-domain modulated signal because the simulations are based only on impedance and power reflection calculations.

A path loss of 60 dB may be assumed between the UE 114 and the BTS 116. Absolute values are not critical and do not alter the conclusions for other values that may be used. However, simulation values are assumed to be constant during a TS. In practice, the UE 114 will often be moving relative to the BTS 116. Assuming that the UE 114 is moving away from the BTS 116 at 50 km/h, the distance between the UE 114 and the BTS 116 will change by ~3 cm for a transmission time interval (TTI) of 2 milliseconds. The resulting average power change is low and does not represent an instantaneous power due to fast fading. A simulation may also be added to provide a random path loss change that would represent fast fading.

Figure 11:
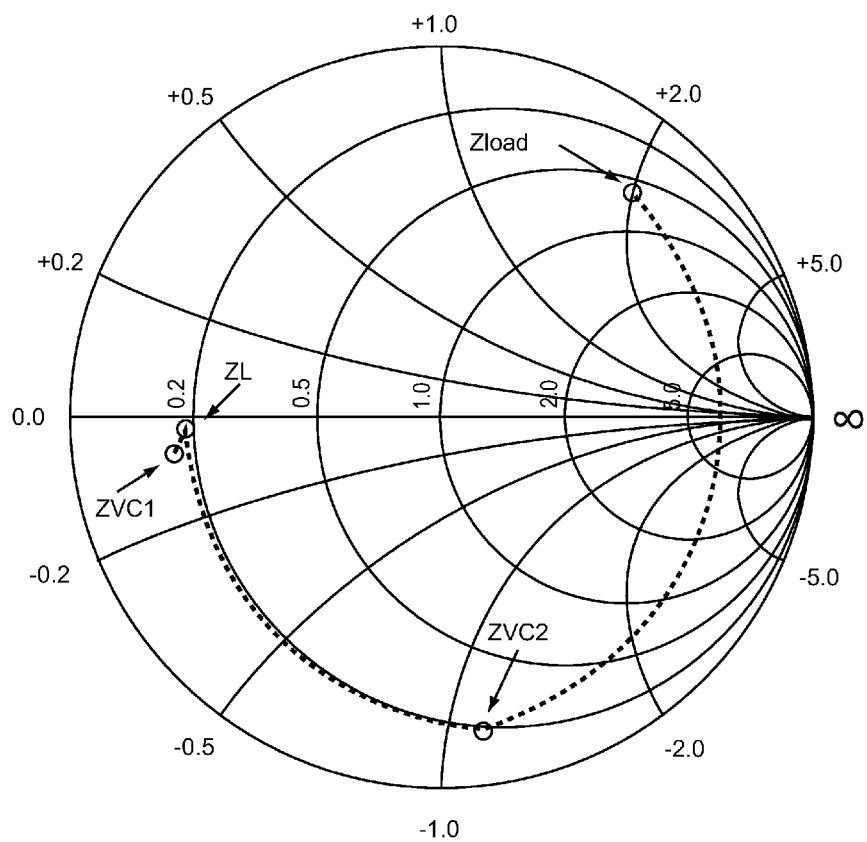
FIG. 11 is a Smith chart that illustrates ATU impedances before the start of the ALGORITHM3 for a first simulation case.
Figure 12:
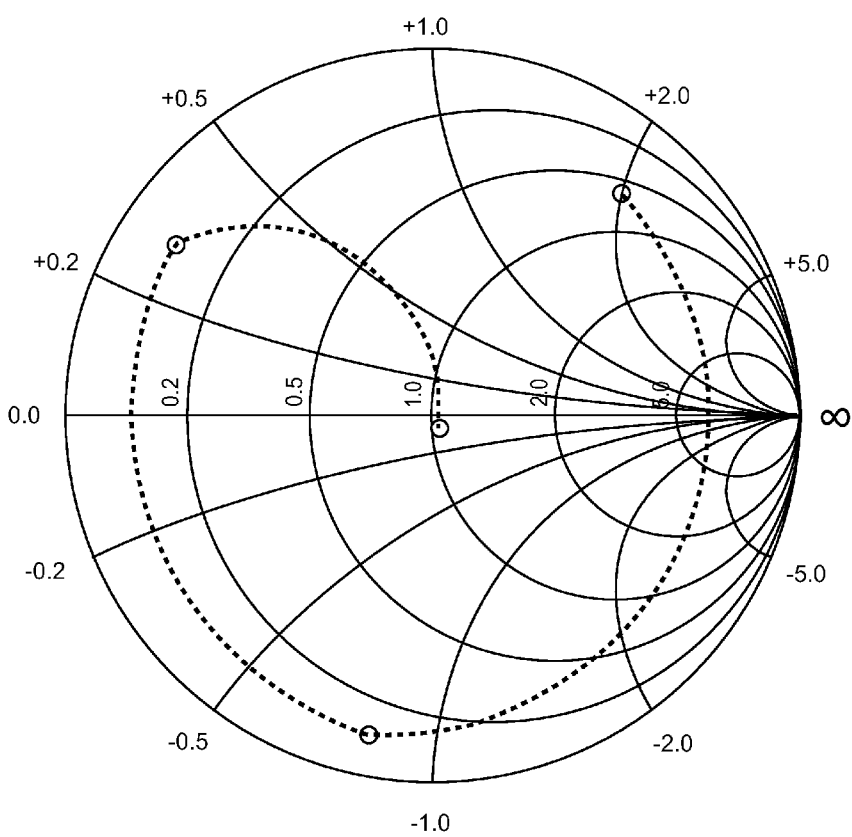
FIG. 12 shows the converged ATU settings near the center of a Smith chart (i.e., 50 ohms) after the completion of the ALGORITHM3 for the first simulation case.

In a first simulation case, an antenna complex load impedance of Zload=31.25+j*100 ohms is assumed. All antenna loads are normalized to a Z0 of 50 ohms. FIG. 11 is a Smith chart that illustrates the impedance Zload at the UE antenna 132 (FIG. 9A); a node impedance ZVC1 for the variable capacitor VC1; a serial node impedance ZL at L0, which is assumed to have a fixed value; and a node impedance ZVC2 for the variable capacitor VC2 before the start of the ALGORITHM3. The Smith chart of FIG. 12 shows the converged settings near the center of the Smith chart (i.e. 50 ohms) after the completion of the ALGORITHM3.

Figure 13:
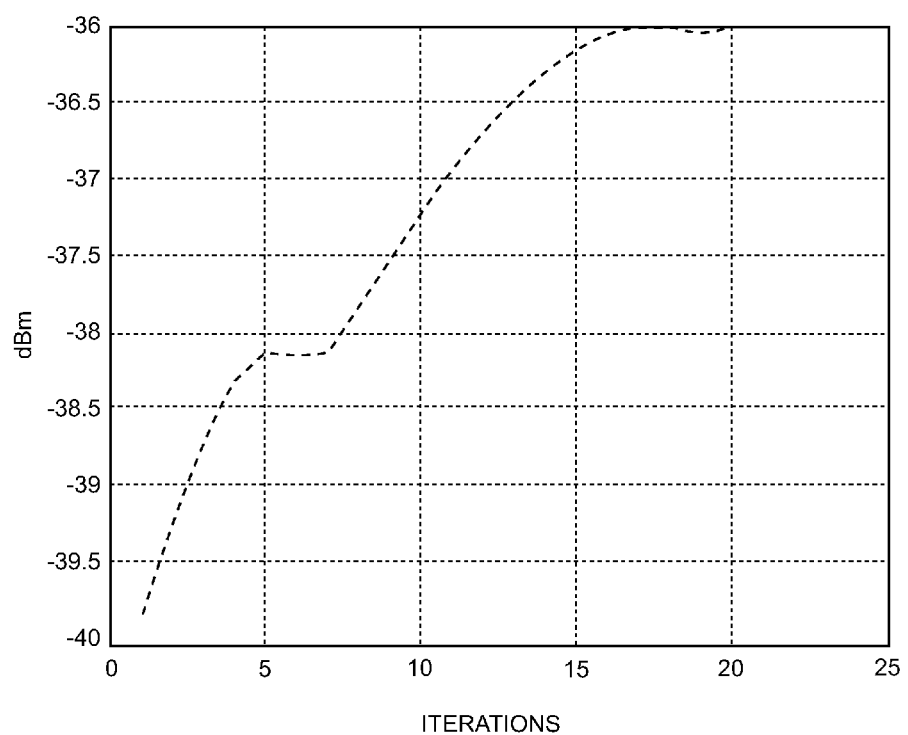
FIG. 13 is a plot of the delivered power at the BTS after running the ALGORITHM3 for the first simulation case.

FIG. 13 is a plot of the delivered power at the BTS 116 after running the ALGORITHM3. The plot confirms that the delivered power increases by at least 4 dBm after about 16 simulation iterations, which is equivalent to about 16 TSs.

Figure 14:
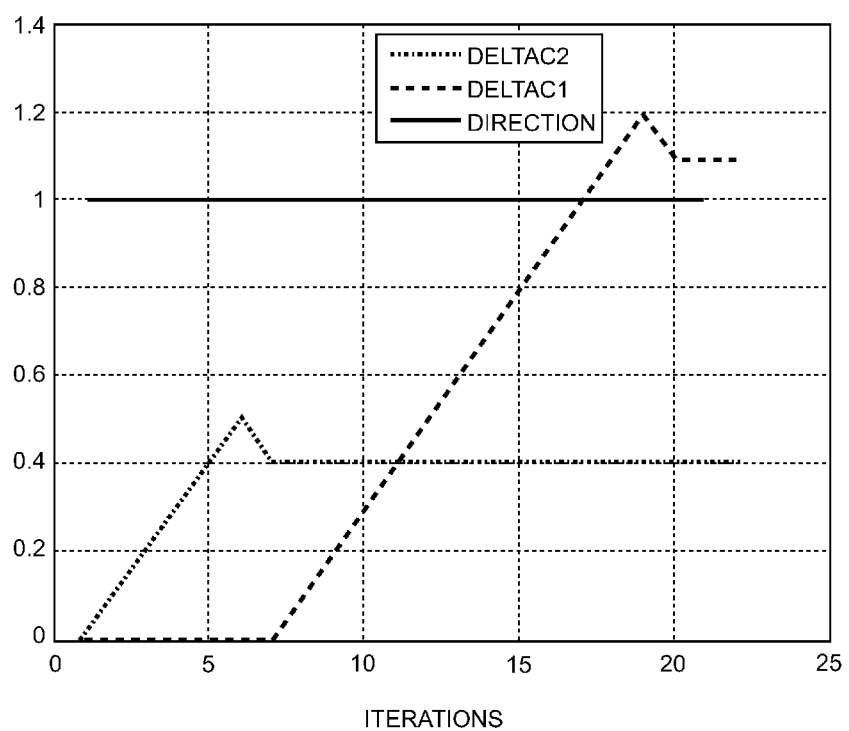
FIG. 14 is a plot of the delta change in capacitance for the variable capacitor VC1 and the variable capacitor VC2 for the first simulation case.

FIG. 14 is a plot of the delta change in capacitance for the variable capacitor VC2 and the variable capacitor VC1. The respective delta changes in capacitance are referred to as DELTAC2 and DELTAC1. The plot shows that control of the ATU 136 begins with changing the capacitance of the variable capacitor VC2 and then switches to the variable capacitor VC1 to change its capacitance on the eighth simulation iteration, and from the eighth iteration to the twentieth iteration the control of the ATU 136 switches back to the variable capacitor VC1. Note that the direction bit of the capacitance change does not change during the simulation represented in FIG. 14.

In the simulation represented in FIG. 14:

$$VC2 = 1.91e-12*(1+DELTAC2(k))F$$

$$VC1 = 2.39e-12*(1+DELTAC1(k))F$$

Figure 15:
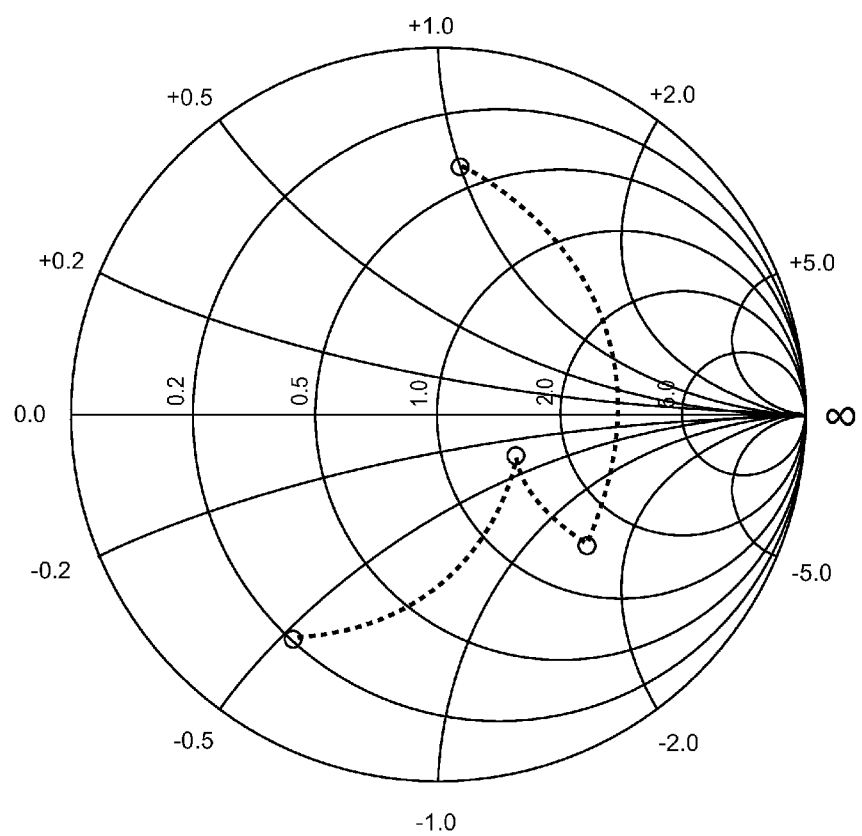
FIG. 15 is a Smith chart that illustrates ATU impedances before the start of the ALGORITHM3 for a second simulation case.
Figure 16:
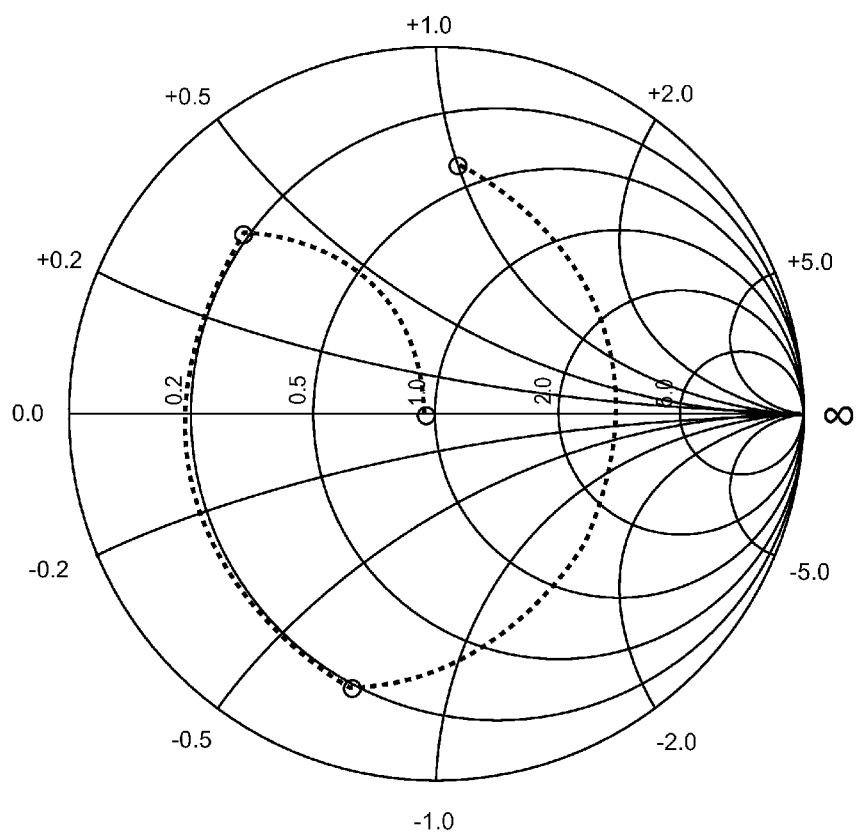
FIG. 16 shows the converged ATU settings near the center of a Smith chart (i.e., 50 ohms) after the completion of the ALGORITHM3 for the second simulation case.

In a second simulation case, the antenna impedance Zload is changed to Zload=20+j*50. FIG. 15 is a Smith chart that includes a plot of the impedance Zload at the UE antenna 132; a node impedance ZVC1 for the variable capacitor VC1; a serial node impedance ZL at L0, which is assumed to have a fixed value; and a node impedance ZVC2 for the variable capacitor VC2 before the start of the ALGORITHM3. FIG. 16 illustrates the impedance transformation at the end of the ALGORITHM3 through the INNER LOOP POWER CONTROL of the ATU 136.

Figure 17:
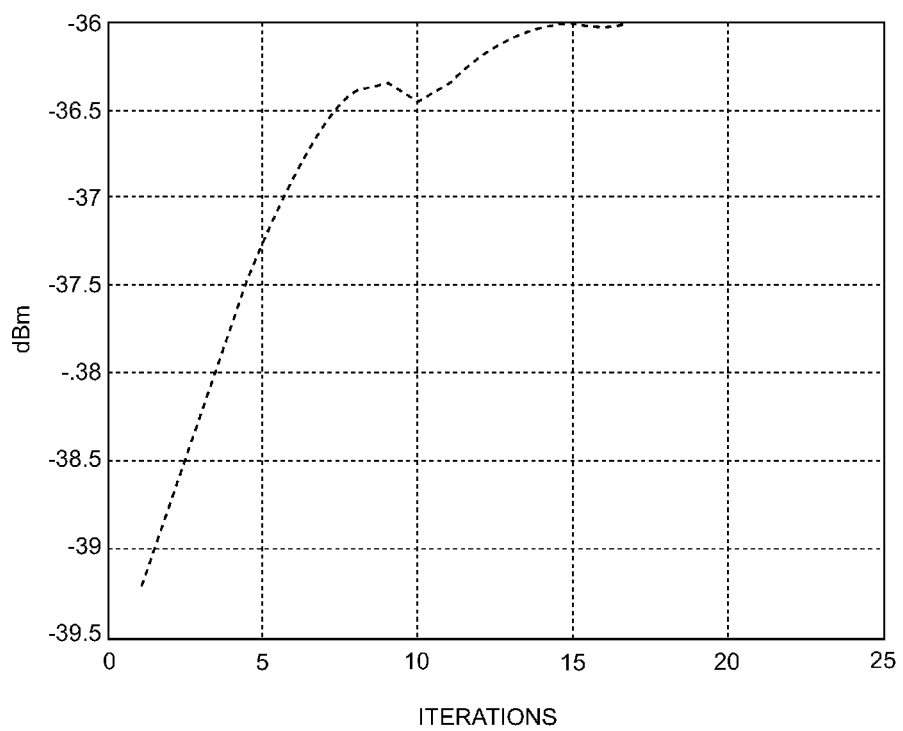
FIG. 17 is a plot of the delivered power at the BTS after running the ALGORITHM3 for the second simulation case.

FIG. 17 is a plot of the delivered power at the BTS 116 illustrating a convergence and increase in the delivered power at the BTS 116 after running the ALGORITHM3. The plot confirms that the delivered power increases by at least 4 dBm after about 14 simulation iterations, which is equivalent to about 14 TSs.

Figure 18:
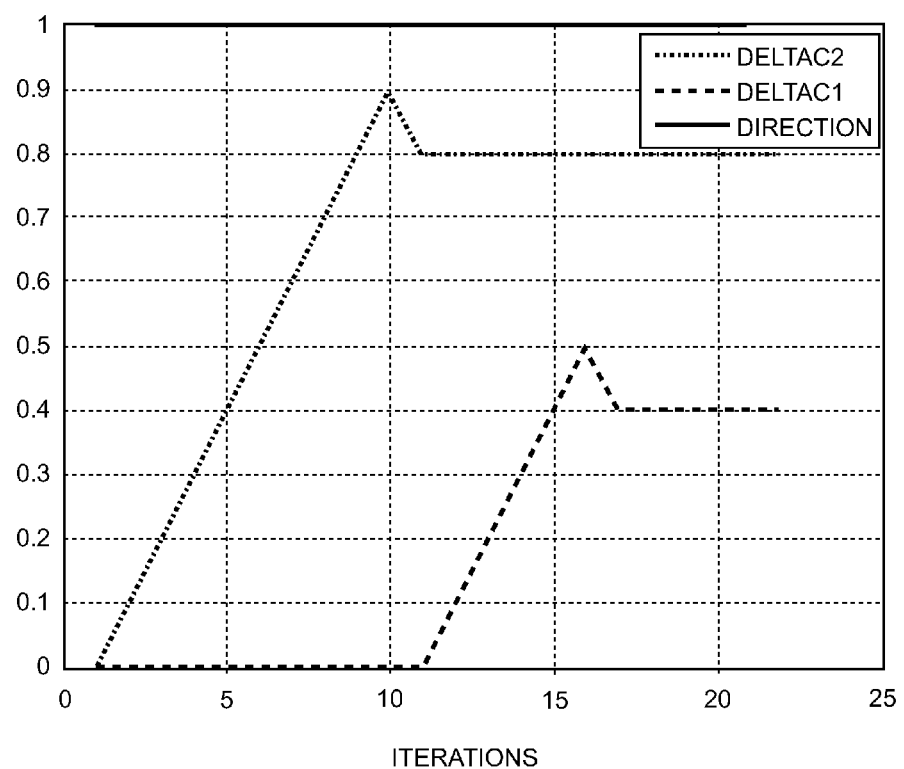
FIG. 18 is a plot of the delta change in capacitance for the variable capacitor VC2 and the variable capacitor VC1 for the second simulation case.

FIG. 18 illustrates the variable capacitor VC1 and the variable capacitor VC2 changes over a plurality of iterations. The plot shows that control of the ATU 136 begins with changing the capacitance of the variable capacitor VC2 and then switches to the variable capacitor VC1 to change its capacitance on the eleventh simulation iteration.

Figure 19:
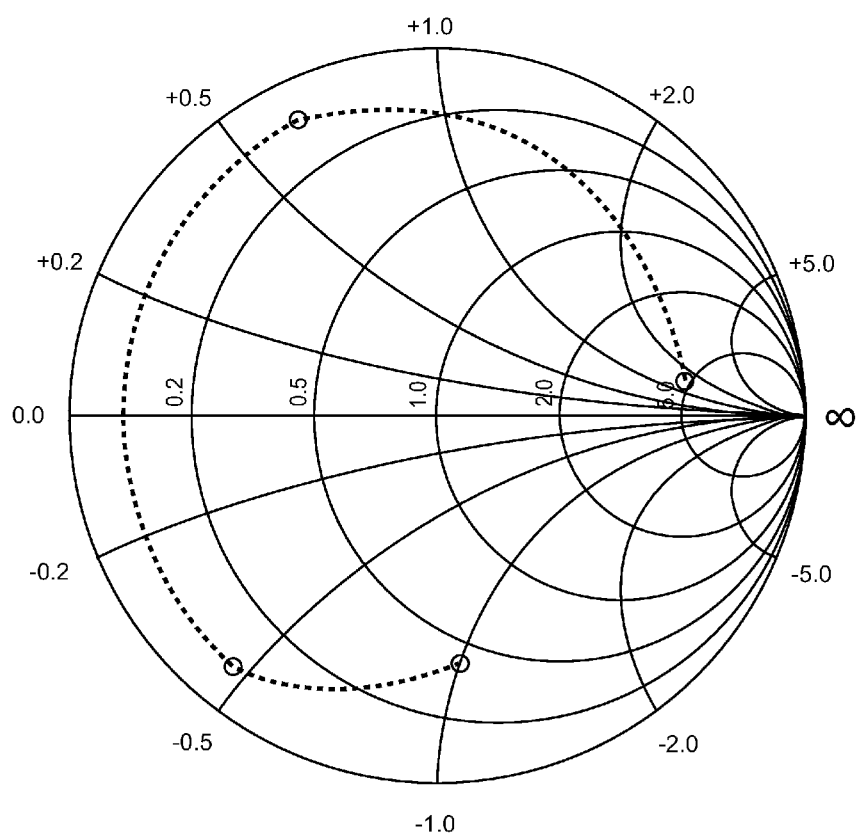
FIG. 19 is a Smith chart that illustrates ATU impedances before the start of the ALGORITHM3 for a third simulation case.
Figure 20:
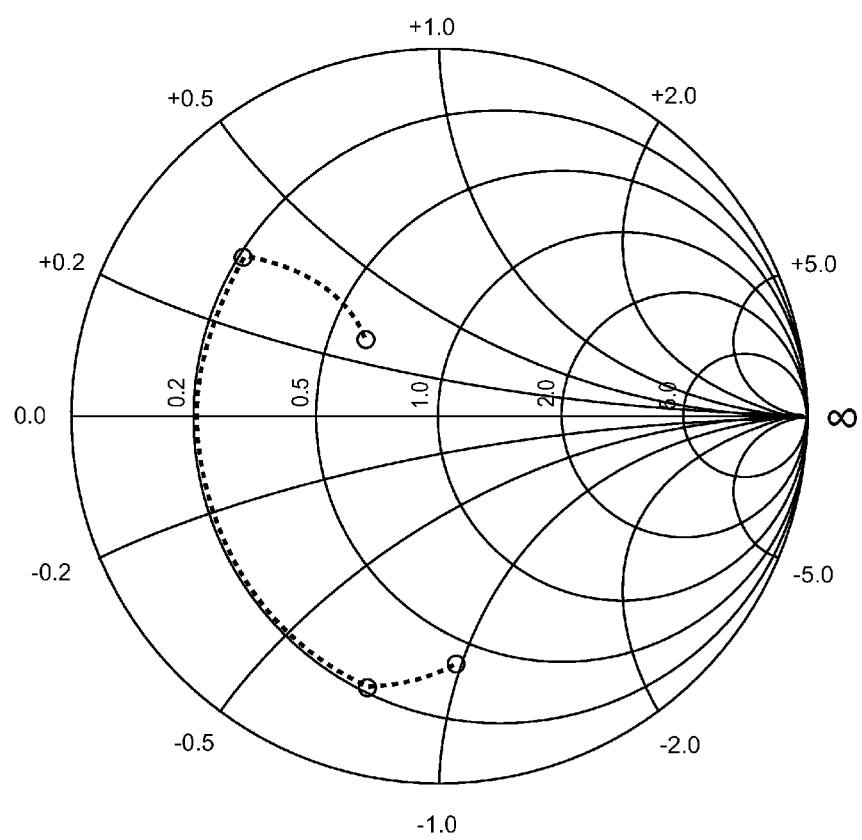
FIG. 20 shows the converged ATU settings near the center of a Smith chart (i.e., 50 ohms) after the completion of the ALGORITHM3 for the third simulation case.

In a third simulation case, the antenna impedance Zload is changed to Zload=20−j*50. FIG. 19 is a Smith chart that includes a plot of the impedance Zload at the UE antenna 132; a node impedance ZVC1 for the variable capacitor VC1; a serial node impedance ZL at L0, which is assumed to have a fixed value; and a node impedance ZVC2 for the variable capacitor VC2 before the start of the ALGORITHM3. FIG. 20 illustrates the impedance transformation at the end of the ALGORITHM3 through the INNER LOOP POWER CONTROL of the ATU 136.

Figure 21:
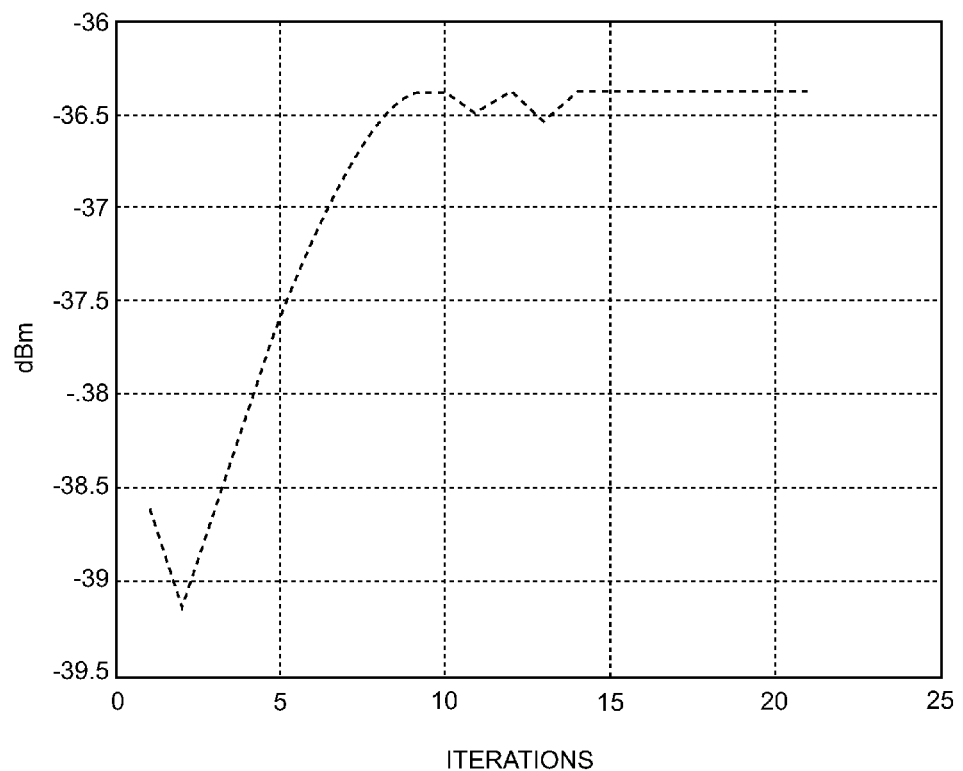
FIG. 21 is a plot of the delivered power at the BTS after running the ALGORITHM3 for the third simulation case.

FIG. 21 is a plot of the delivered power at the BTS 116 illustrating a convergence and increase in the delivered power at the BTS 116 after running the ALGORITHM3. The plot confirms that the delivered power increases by at least 3.5 dBm after about 7 simulation iterations, which is equivalent to about 7 TSs.

Figure 22:
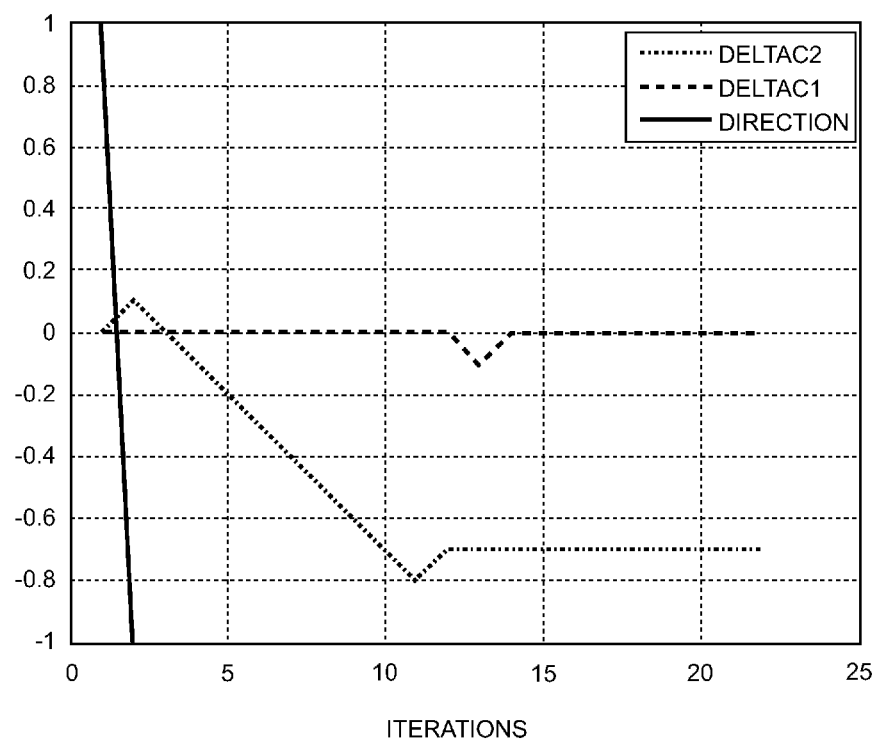
FIG. 22 is a plot of the delta change in capacitance for the variable capacitor VC1 and the variable capacitor VC2 for the third simulation case.

FIG. 22 illustrates the variable capacitor VC1 and the variable capacitor VC2 changes over a plurality of iterations. The plot shows that control of the ATU 136 begins with changing the capacitance of the variable capacitor VC2. The capacitance of the variable capacitor VC1 remains relatively unchanged throughout the simulation. Note that the direction of the capacitance change reverses at the beginning of the simulation. As a result, the capacitance of the variable capacitor VC2 decreases between the second and eleventh iterations.

Figure 23:
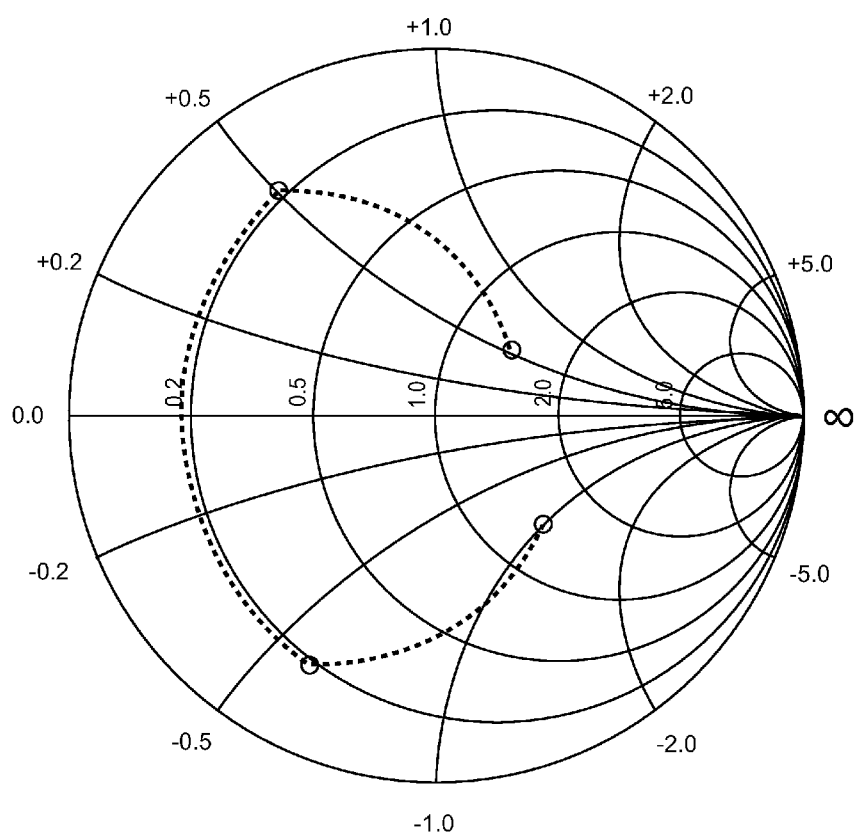
FIG. 23 is a Smith chart that illustrates ATU impedances before the start of the ALGORITHM3 for a fourth simulation case.
Figure 24:
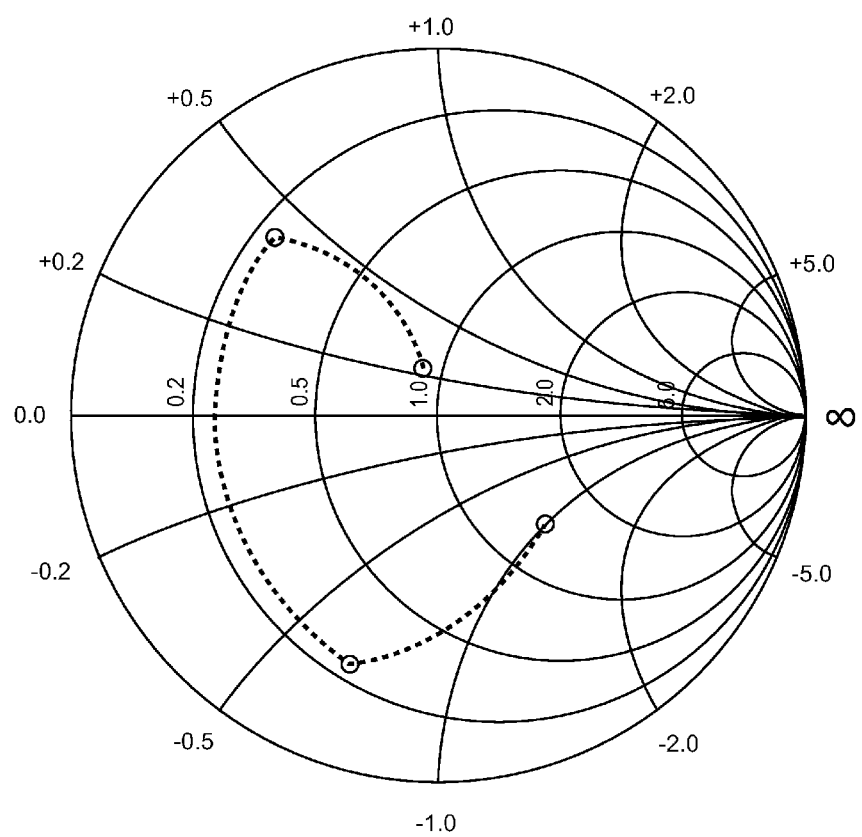
FIG. 24 shows the converged ATU settings near the center of the Smith chart (i.e., 50 ohms) after the completion of the ALGORITHM3 for the fourth simulation case.

In a fourth simulation case, the antenna impedance Zload is changed to Zload=70−j*50. FIG. 23 is a Smith chart that includes a plot of the impedance Zload at the UE antenna 132; a node impedance ZVC1 for the variable capacitor VC1; a serial node impedance ZL at L0, which is assumed to have a fixed value; and a node impedance ZVC2 for the variable capacitor VC2 before the start of the ALGORITHM3. FIG. 24 illustrates the impedance transformation at the end of the ALGORITHM3 through the INNER LOOP POWER CONTROL of the ATU 136.

Figure 25:
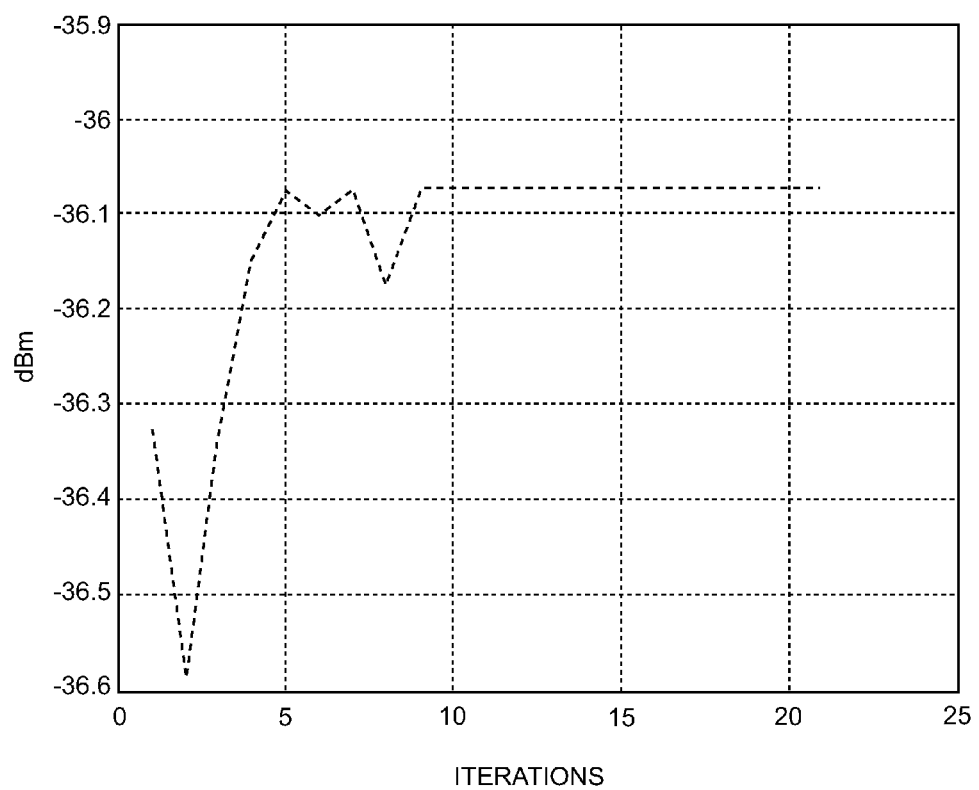
FIG. 25 is a plot of the delivered power at the BTS after running the ALGORITHM3 for the fifth simulation case.

FIG. 25 is a plot of the delivered power at the BTS 116 illustrating a convergence and increase in the delivered power at the BTS 116 after running the ALGORITHM3. The plot confirms that the delivered power increases by at least 0.6 dB after about 5 simulation iterations, and settles to that value by about 9 simulations, which is equivalent to about 9 TSs.

Figure 26:
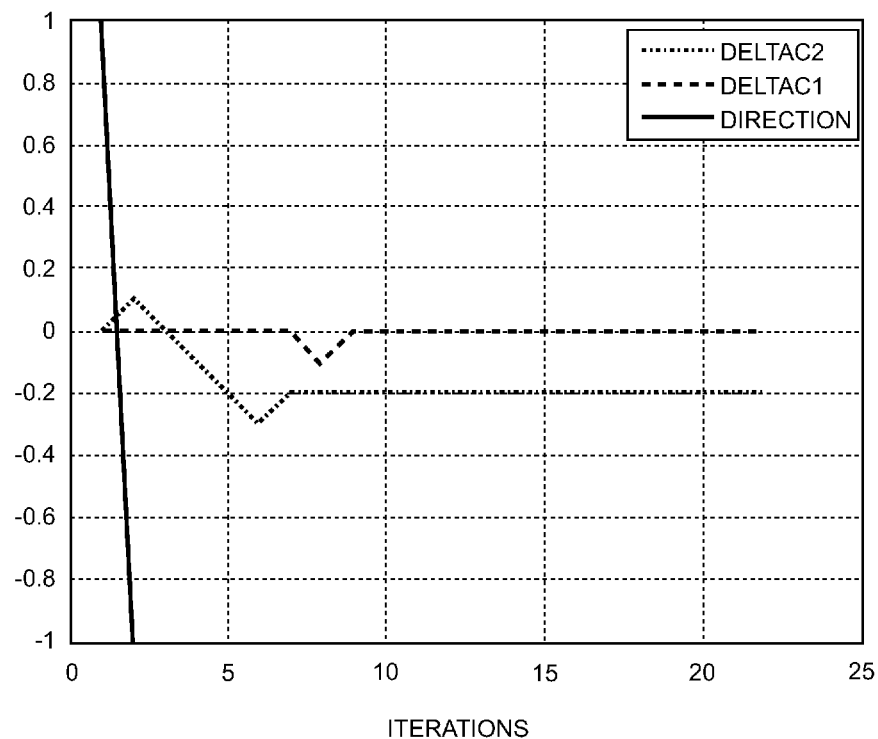
FIG. 26 is a plot of the delta change in capacitance for the variable capacitor VC1 and the variable capacitor VC1 for the fifth simulation case.

FIG. 26 illustrates the variable capacitor VC1 and the variable capacitor VC2 changes over a plurality of iterations. The plot shows that control of the ATU 136 begins with changing the capacitance of the variable capacitor VC2. The capacitance of the variable capacitor VC1 remains relatively unchanged throughout the simulation. Note that the direction of the capacitance change reverses at the beginning of the simulation. As a result, the capacitance of the variable capacitor VC2 decreases between the second and sixth iterations. Notice also that the capacitance only changed by about 20%. The relatively smaller change provides the modest power gain of 0.6 dBm.

Figure 27:
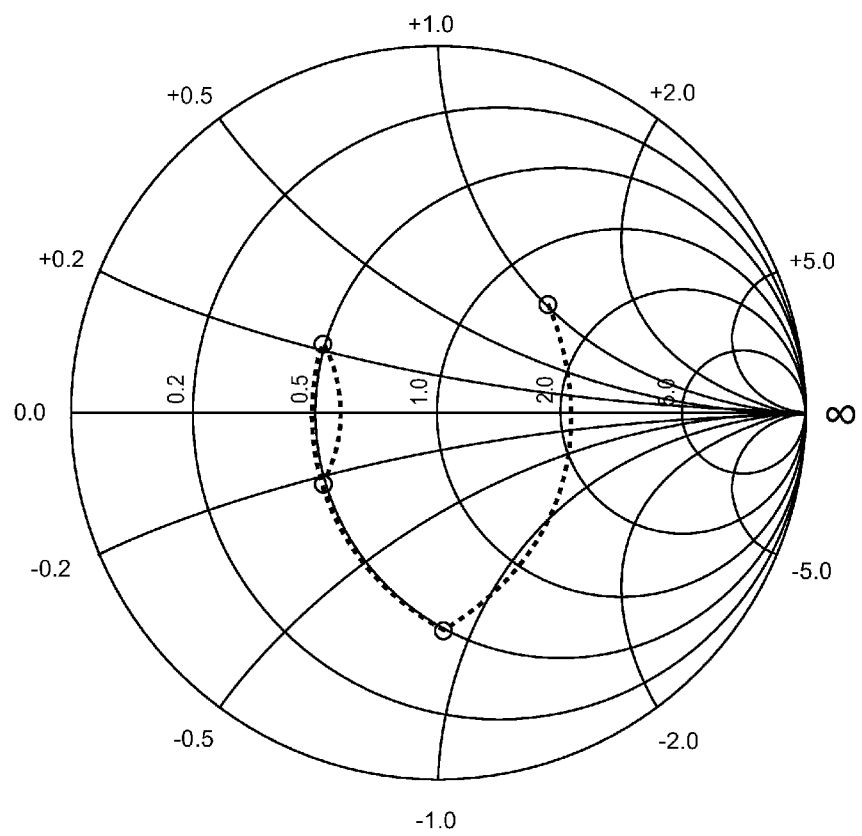
FIG. 27 is a Smith chart that illustrates ATU impedances before the start of the ALGORITHM3 for a fifth simulation case.
Figure 28:
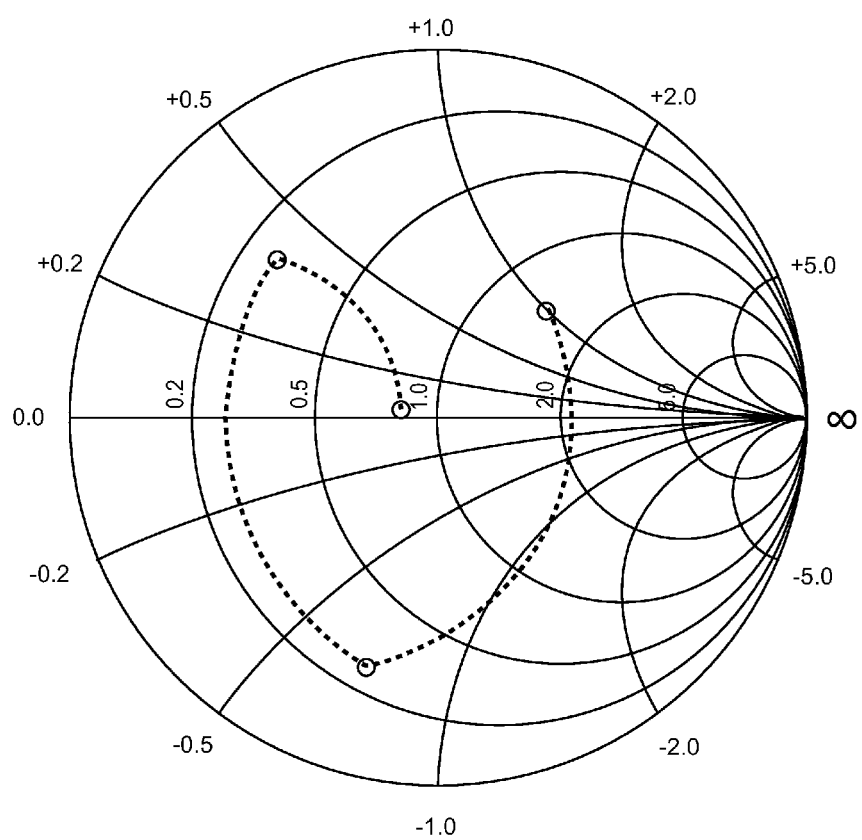
FIG. 28 shows the converged ATU settings near the center of a Smith chart (i.e., 50 ohms) after the completion of the ALGORITHM3 for the fifth simulation case.

In a fifth simulation case, the antenna impedance Zload is changed to Zload=70+j*50. FIG. 27 is a Smith chart that includes a plot of the impedance Zload at the UE antenna 132; a node impedance ZVC1 for the variable capacitor VC1; a serial node impedance ZL at L0, which is assumed to have a fixed value; and a node impedance ZVC2 for the variable capacitor VC2 before the start of the ALGORITHM3. FIG. 28 illustrates the impedance transformation at the end of the ALGORITHM3 through the INNER LOOP POWER CONTROL of the ATU 136.

Figure 29:
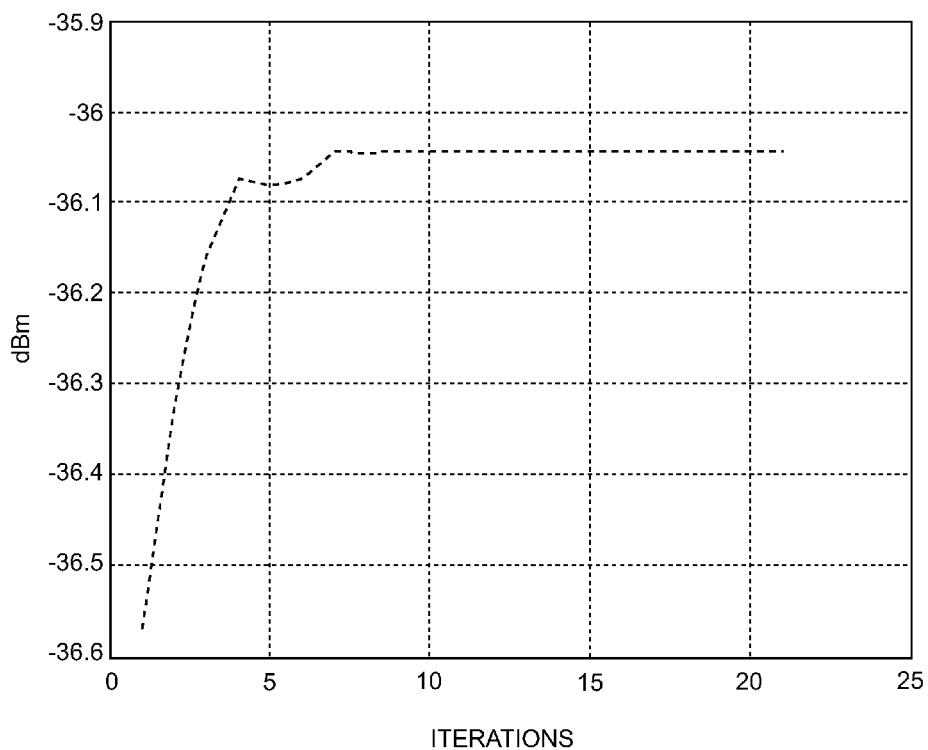
FIG. 29 is a plot of the delivered power at the BTS after running the ALGORITHM3 for the fifth simulation case including an assumption of a path loss of 60 dB.

FIG. 29 is a plot of the delivered power at the BTS 116 illustrating a convergence and increase in the delivered power at the BTS 116 after running the ALGORITHM3. The plot confirms that the delivered power increases by at least 0.6 dB after about 6 simulation iterations, and settles to that value by about 7 simulations, which is equivalent to about 7 TSs.

Figure 30:
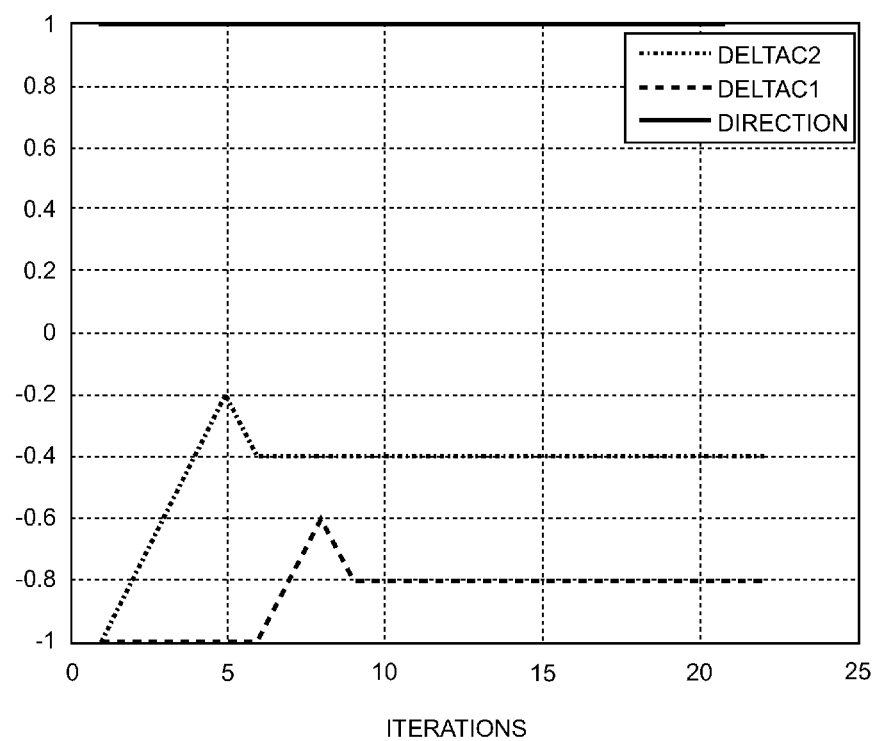
FIG. 30 is a plot of the delta change in capacitance for the variable capacitor VC2 and the variable capacitor VC1 for the fifth simulation case including an assumption of a path loss of 60 dB.

FIG. 30 illustrates the variable capacitor VC1 and the variable capacitor VC2 changes over a plurality of iterations. The plot shows that control of the ATU 136 begins with changing the capacitance of the variable capacitor VC2. The capacitance of the variable capacitor VC1 is changed just after the capacitance for the variable capacitor VC2 settles. Notice also that the capacitance for the variable capacitor VC2 changes about 40%, while the variable capacitor VC1 is changed by about 20%. Similar to the fourth simulation case, the relatively smaller changes in capacitance provides only a modest power gain of about 0.6 dbm.

Figure 31:
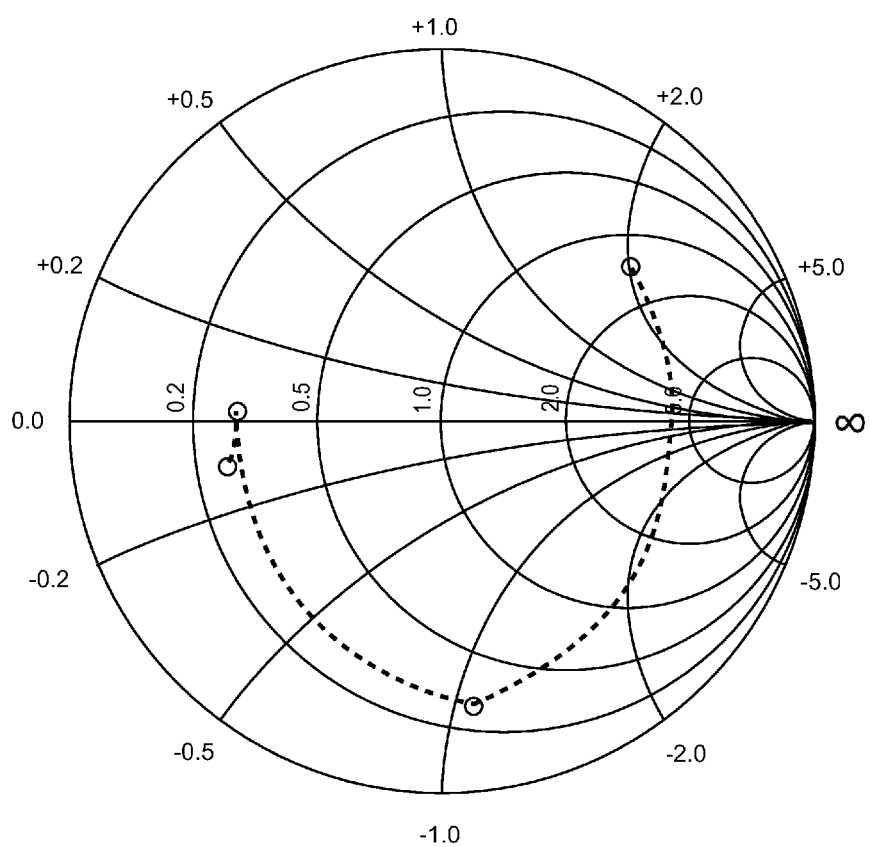
FIG. 31 is a Smith chart that illustrates ATU impedances before the start of the ALGORITHM3 for a sixth simulation case.
Figure 32:
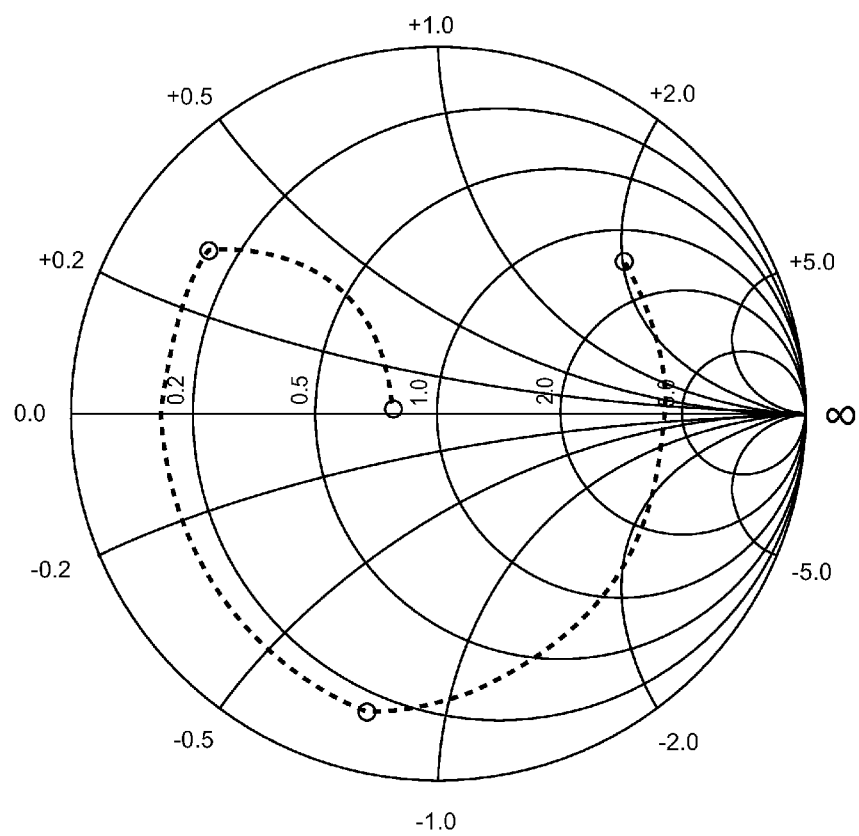
FIG. 32 shows the converged ATU settings near the center of a Smith chart (i.e., 50 ohms) after the completion of the ALGORITHM3 for the sixth simulation case.

In a sixth simulation case, the antenna impedance Zload is changed to Zload=70+j*100. FIG. 31 is a Smith chart that includes a plot of the impedance Zload at the UE antenna 132; a node impedance ZVC1 for the variable capacitor VC1; a serial node impedance ZL at L0, which is assumed to have a fixed value; and a node impedance ZVC2 for the variable capacitor VC2 before the start of the ALGORITHM3. FIG. 32 illustrates the impedance transformation at the end of the ALGORITHM3 through the INNER LOOP POWER CONTROL of the ATU 136.

Figure 33:
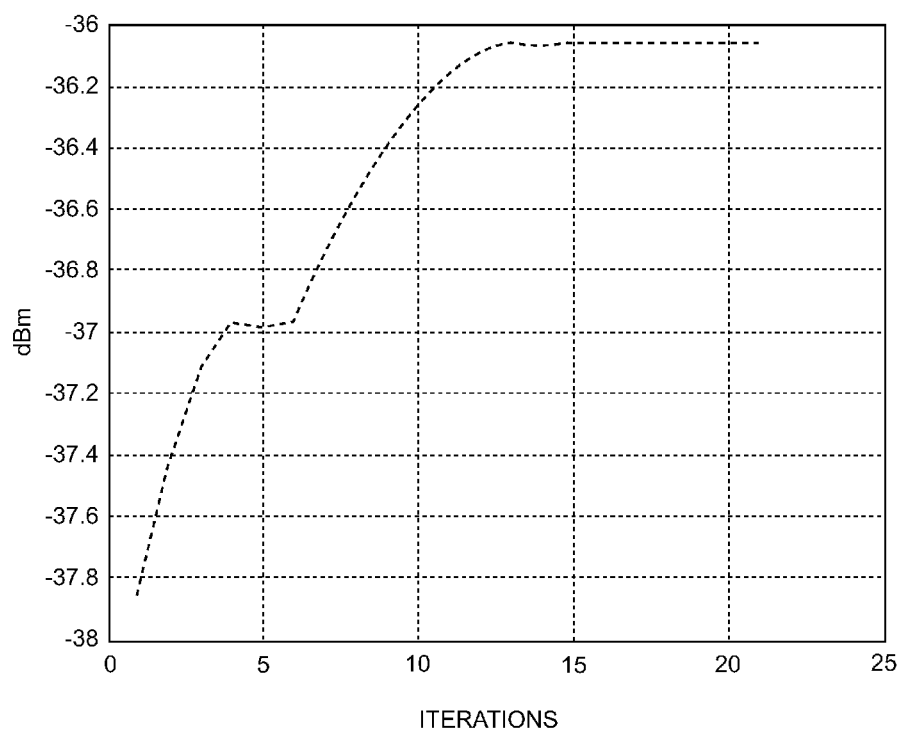
FIG. 33 is a plot of the delivered power at the BTS after running the ALGORITHM3 for the sixth simulation case.

FIG. 33 is a plot of the delivered power at the BTS 116 illustrating a convergence and increase in the delivered power at the BTS 116 after running the ALGORITHM3. The plot confirms that the delivered power increases by at least 0.9 dBm after about 4 simulation iterations, and increases almost 1 dBm by about 13 simulations, which is equivalent to about 13 TSs.

Figure 34:
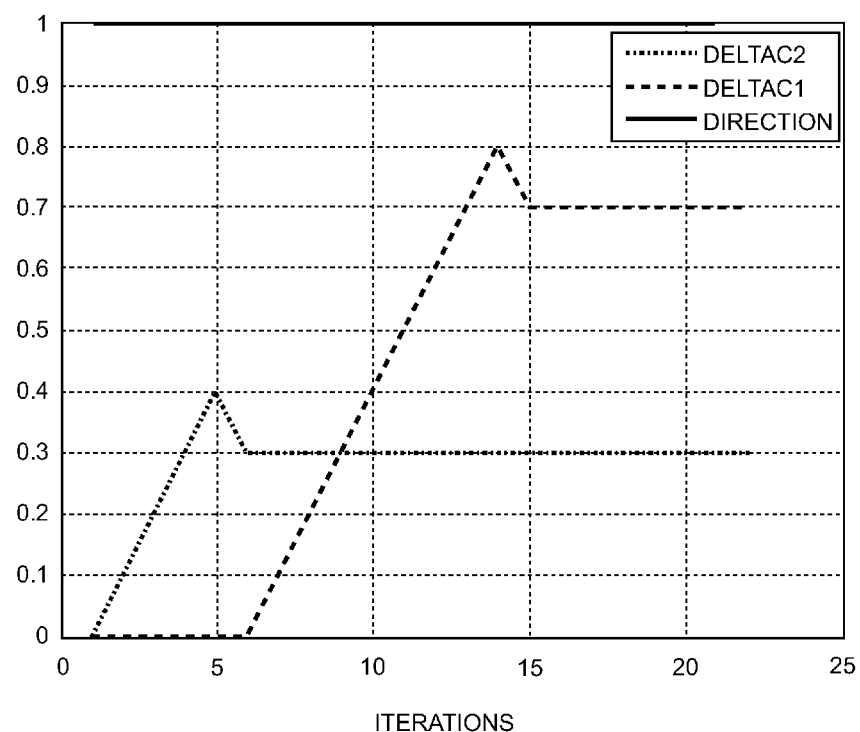
FIG. 34 is a plot of the delta change in capacitance for the variable capacitor VC2 and the variable capacitor VC1 for the sixth simulation case.

FIG. 34 illustrates the capacitance changes made to the variable capacitor VC1 and the variable capacitor VC2 over a plurality of iterations. The plot shows that control of the ATU 136 begins with changing the capacitance of the variable capacitor VC2. The capacitance of the variable capacitor VC1 is changed just after the capacitance for the variable capacitor VC2 settles. Notice that the capacitance for the variable capacitor VC2 settles to a change of about 30%, while the variable capacitor VC1 settles to a change of about 70%.

Figure 35:
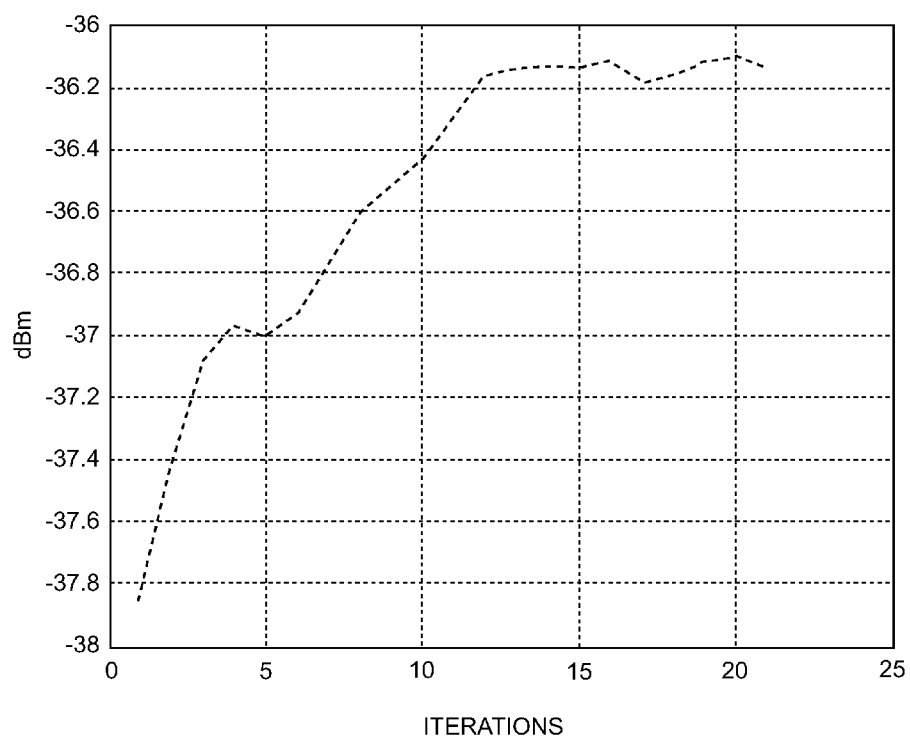
FIG. 35 is a plot illustrating a convergence and increase in the delivered power at the BTS after running the ALGO-RITHM3.

FIG. 35 is a plot illustrating a convergence and increase in the delivered power at the BTS 116 after running the ALGORITHM3, which results in the variable capacitor VC1 and the variable capacitor VC2 changes illustrated in FIG. 36 described below. However, in this case the plot of the delivered power at the BTS 116 accounts for a 60 dB path loss between the UE 114 and the BTS 116 (FIG. 9A).

Figure 36:
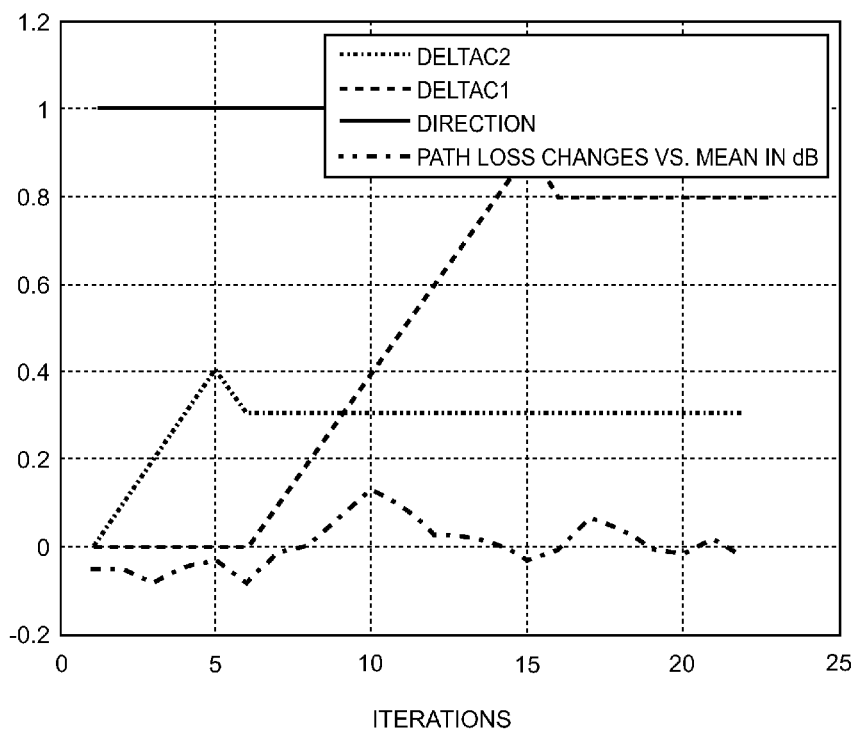
FIG. 36 is a plot of capacitance changes for the variable capacitor VC1 and the variable capacitor VC2 for the sixth simulation case.

FIG. 36 is a plot of capacitance changes for the variable capacitor VC1 and the variable capacitor VC2 for the sixth simulation case. In this particular simulation run, the capacitance change for the variable capacitor VC1 settles at around 30%, while the capacitance change for the variable capacitor VC2 settles to about 80%. A path loss change versus a mean path loss in dB is included.

Figure 37:
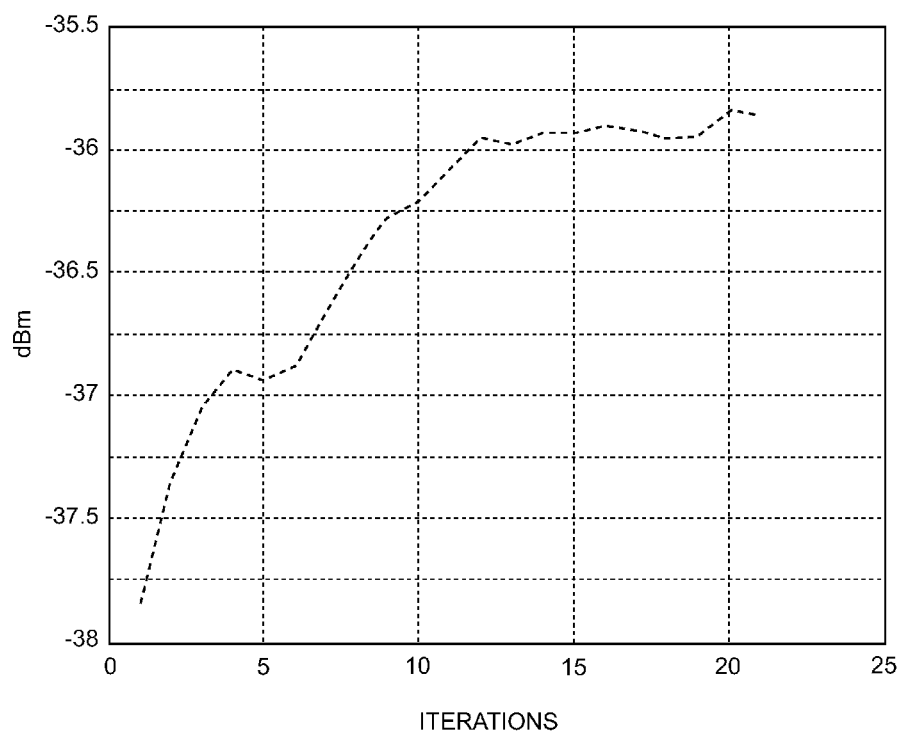
FIG. 37 is a plot of delivered power at the BTS that is transmitted from the UE at a frequency of 2 GHz.

FIG. 37 is a plot of delivered power at the BTS 116 that is transmitted from the UE 114 at a frequency of 2 GHz. The path loss between the UE 114 and the BTS 116 is set at 59.89 dB for the duration of the simulation.

Figure 38:
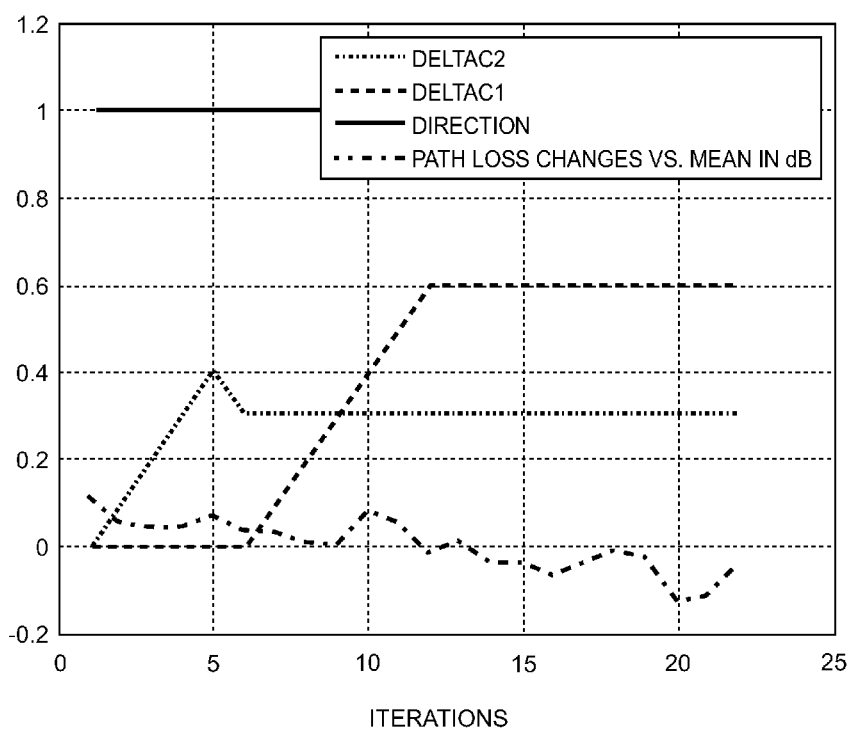
FIG. 38 is a plot of capacitance changes for the variable capacitor VC1 and the variable capacitor VC2 for different conditions for the sixth simulation case.

FIG. 38 is a plot of capacitance changes for the variable capacitor VC1 and the variable capacitor VC2 for the sixth simulation case. In this particular simulation run the capacitance change for the variable capacitor VC1 settles at around 40%, while the capacitance change for the variable capacitor VC2 settles to about 60%. A path loss change versus a mean path loss in dB is included.

Figure 39:
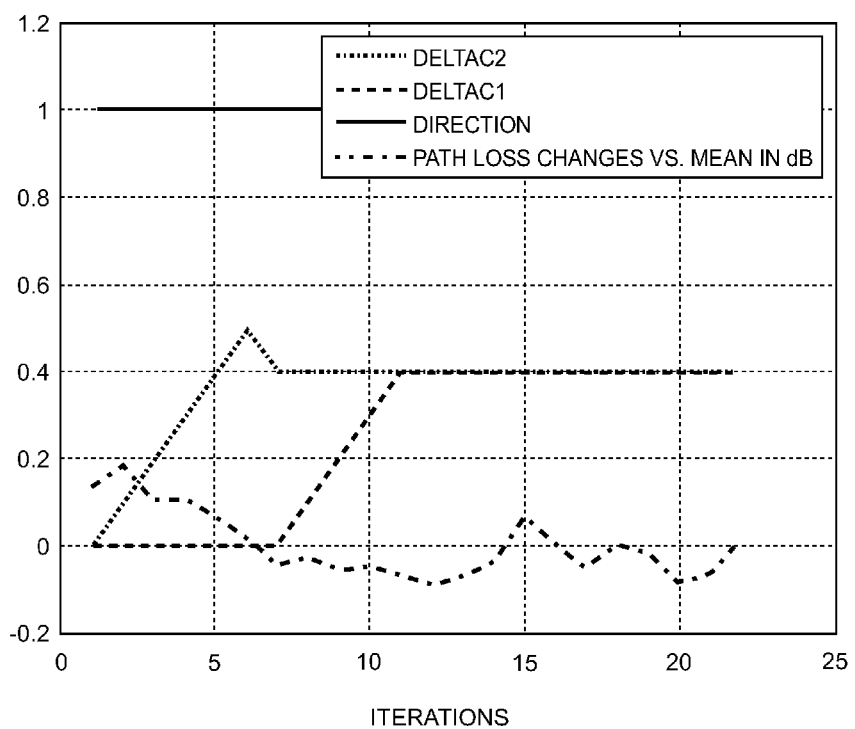
FIG. 39 is a plot of capacitance changes for the variable capacitor VC1 and the variable capacitor VC2 for different conditions for the sixth simulation case.

FIG. 39 is a plot of capacitance changes for the variable capacitor VC1 and the variable capacitor VC2 for the sixth simulation case. In this particular simulation run, the capacitance changes for both the variable capacitor VC1 and the variable capacitor VC2 settle at around 40%. A path loss change versus a mean path loss in dB is included.

Figure 40:
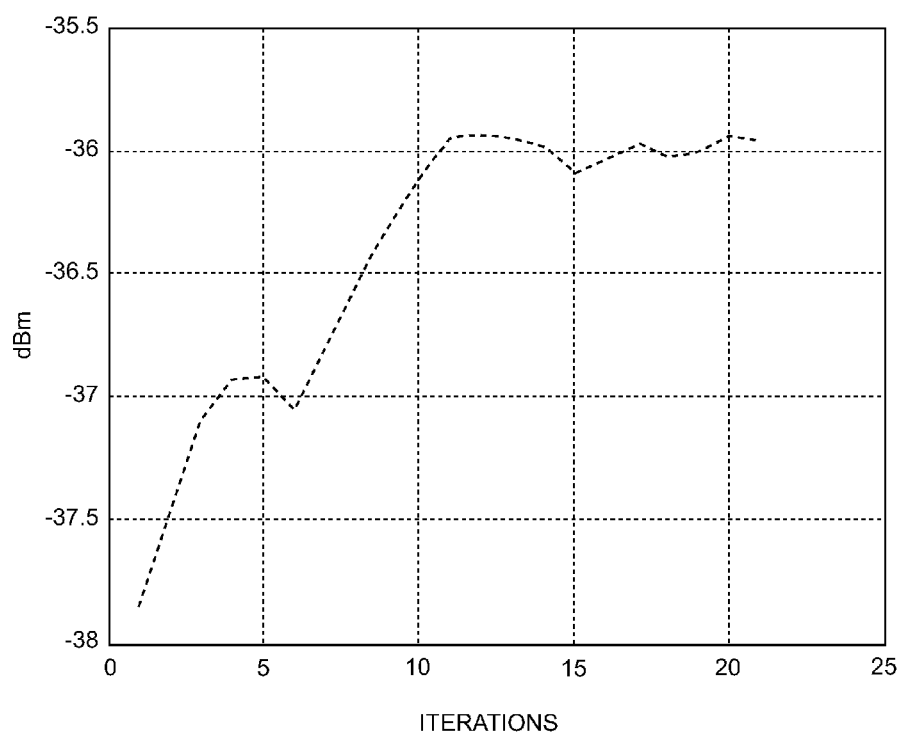
FIG. 40 is a plot of delivered power at the BTS that is transmitted from the UE at a frequency of 2 GHz with a fixed path loss.

FIG. 40 is a plot of delivered power at the BTS 116 that is transmitted from the UE 114 at a frequency of 2 GHz. The path loss between the UE 114 and the BTS 116 is set at 59.87 dB for the duration of the simulation.

It is important to note that the changes of the variable capacitor VC1 and the variable capacitor VC2 are performed at relatively small phase jumps that are preferably less than 30 degrees. As a result, the number of tuning elements making up the ATU 136 may need to be increased if switchable capacitors and inductors are used in place of continuous tuning elements such as variable capacitance diodes. Using a relatively large number of switchable tuning elements for the ATU 136 may be undesirable in some cases due to a relatively high cost of implementation. One method to reduce the number of tunable elements is to perform antenna tuning adjustments at every frame or at a frame multiple rather than at each TS. This method would allow a phase jump larger than 30 degrees, but smaller than 60 degrees, which would be acceptable in more and less cases.

Another complexity addressed by the present disclosure pertains to duplex communication systems that require optimization of antenna tuning for both the transmitter and receiver of the UE 114. In a duplex communication system, the receive frequency is at a different frequency than the transmit frequency. For some bands, like UTMS Band 4, the duplex frequency offset is very large, equal to 400 MHz. By comparison, the duplex frequency offset for UTMS Band 1 is only 190 MHz. Thus, an optimization of the tunable element settings for the ATU 136 for a given transmit frequency would likely not yield an optimization of the tunable elements settings for the ATU 136 for an offset receive frequency. One solution would be to adapt the ATU 136 for broadband tuning to create optimized tuning peaks for both the TX and RX frequencies. However, in some cases broadband tuning would result in undesirably complex filter circuit topologies.

A different method for solving the duplex communications issue involves using the ALGORITHM3 to measure the power level delivered to the UE 114 at the receive frequency. In this case, the ALGORITHM3 averages measured received power levels at both the UE 114 and the BTS 116 to determine an average link power level. The average link power level can be determined by a logarithmic averaging of a linear averaging. Alternately, some weighting can be introduced if the TX frequency is to be more favored than the RX frequency. This averaging method preferably has a sampling period that is applied every two TSs rather than each TS. In this way, the UE 114 reports received power levels to the BTS 116 using the DOWNLINK RADIO CHANNEL. In this way, the BTS 116 can make determinations for TPC commands based upon both an uplink power level and a downlink power level for the same ATU settings.

Figure 41:
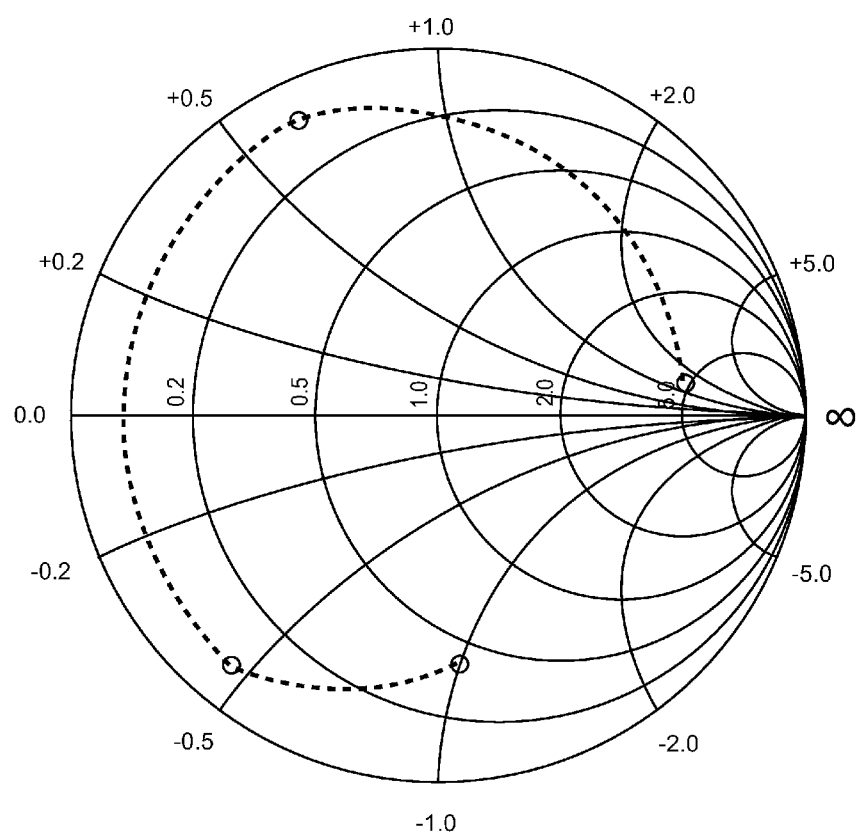
FIG. 41 is a Smith chart that illustrates ATU impedances before the start of the ALGORITHM3, including logarithmic averaging.
Figure 42:
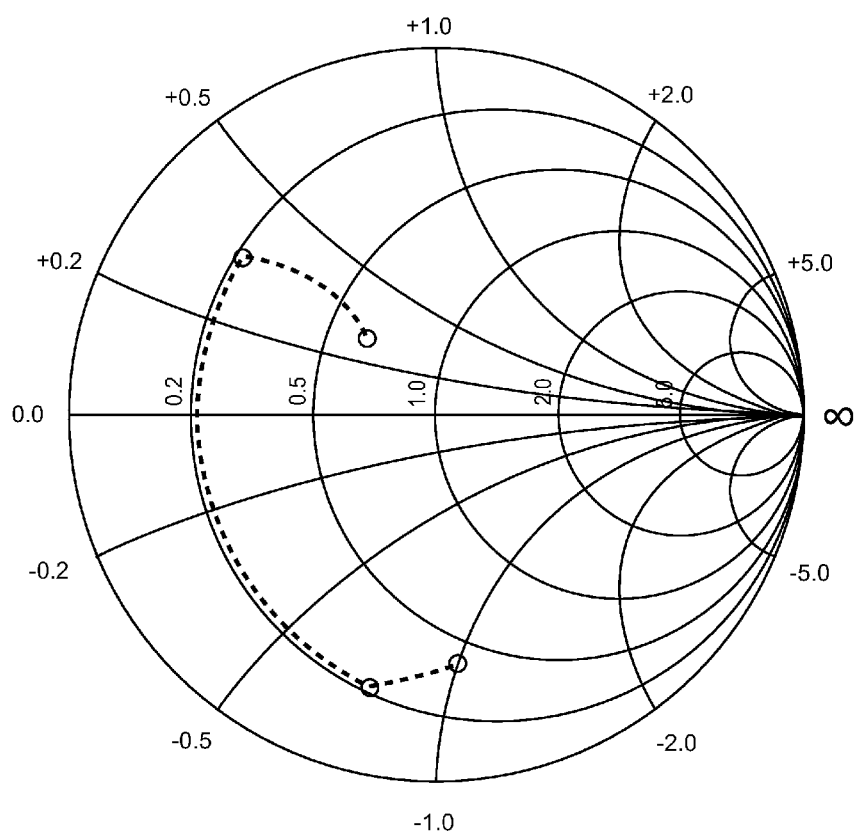
FIG. 42 illustrates the impedance transformation at the end of the ALGORITHM3 through the INNER LOOP power control of the ATU.

The ALGORITHM3, including averaging for both an uplink power level and a downlink power level, can be simulated for various loads, noise levels, and path losses. For example, in a first case, logarithmic averaging of the power received at the UE 114 and the power received at the BTS 116 may be simulated for an RX to TX frequency offset of 190 MHz with an antenna load of Zload=20-j*50 ohms. FIG. 41 is a Smith chart that includes a plot of the impedance Zload at the UE antenna 132, a node impedance ZVC1 for the variable capacitor VC1; a serial node impedance ZL at L0, which is assumed to have a fixed value; and a node impedance ZVC2 for the variable capacitor VC2 before the start of the ALGORITHM3. FIG. 42 illustrates the impedance transformation at the end of the ALGORITHM3 through the INNER LOOP POWER CONTROL of the ATU 136.

Figure 43:
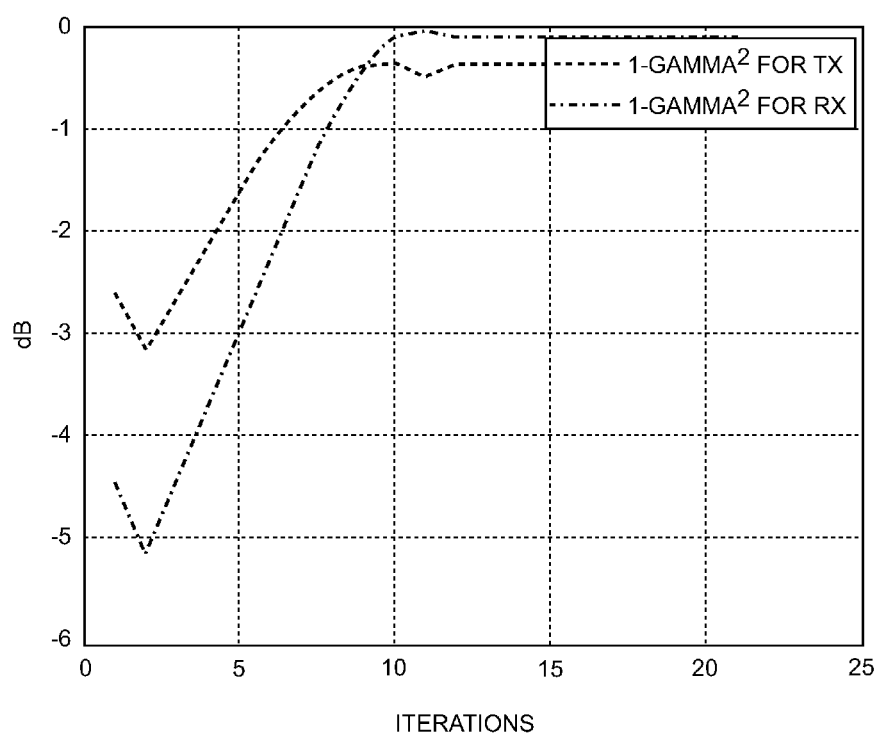
FIG. 43 is a plot of 1-GAMMA$^2$ in dB for both the transmit (TX) and receive (RX) frequencies, wherein logarithmic averaging is used with the ALGORITHM3.

FIG. 43 is a plot of 1-GAMMA$^2$ in dB for both the TX and RX frequencies wherein logarithmic averaging is used with the ALGORITHM3. Note that 1-GAMMA$^2$ for the TX and the RX frequencies is both optimized in an appropriate direction.

Figure 44:
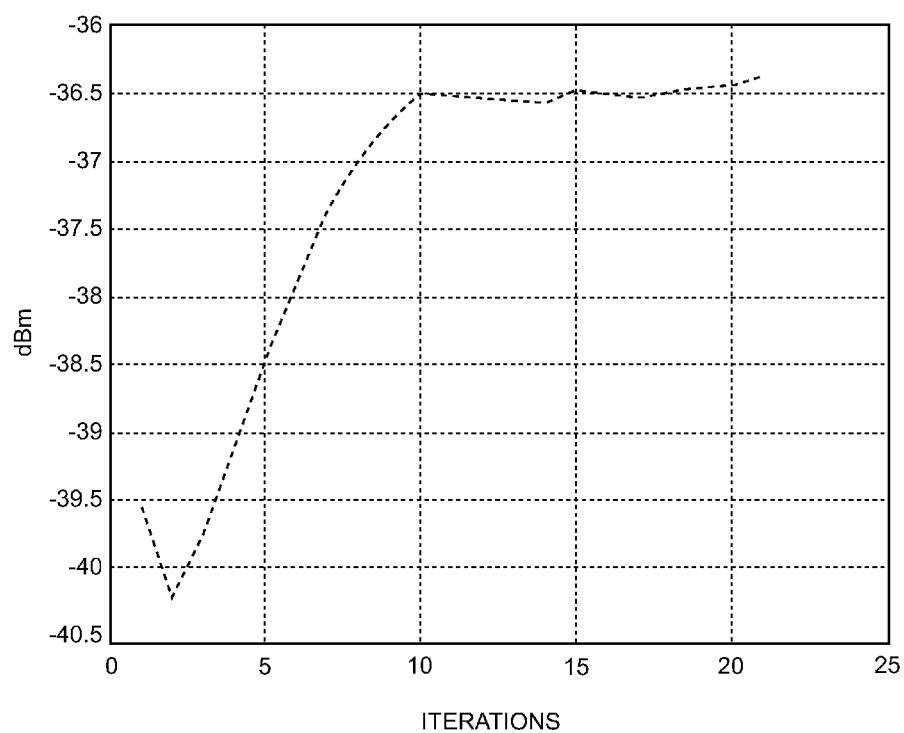
FIG. 44 is a plot of the delivered power at the BTS illustrating a convergence and increase in the delivered power at the BTS after running the ALGORITHM3, including steps that logarithmically average the power received at the UE and the power received at the BTS.

FIG. 44 is a plot of the delivered power at the BTS 116 illustrating a convergence and increase in the delivered power at the BTS 116 after running the ALGORITHM3, including steps that logarithmically average the power received at the UE 114 and the power received at the BTS 116. The plot confirms that the delivered power increases by at least 3 dBm after about 10 simulation iterations, which is equivalent to about 10 TSs.

Figure 45:
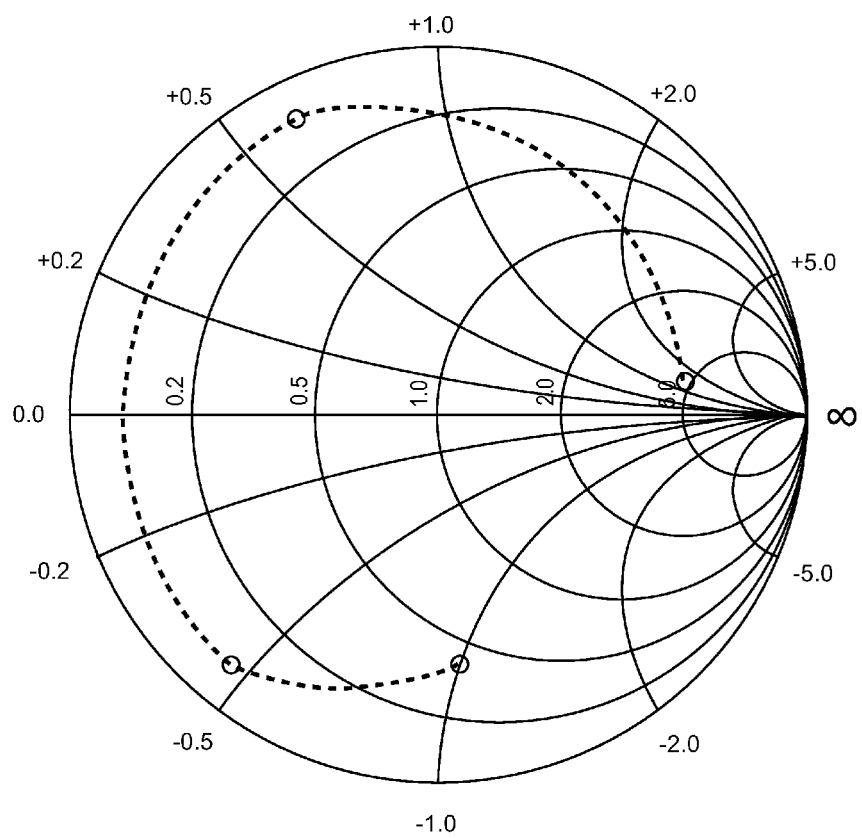
FIG. 45 is a Smith chart that illustrates ATU impedances before the start of the ALGORITHM3, including linear averaging.
Figure 46:
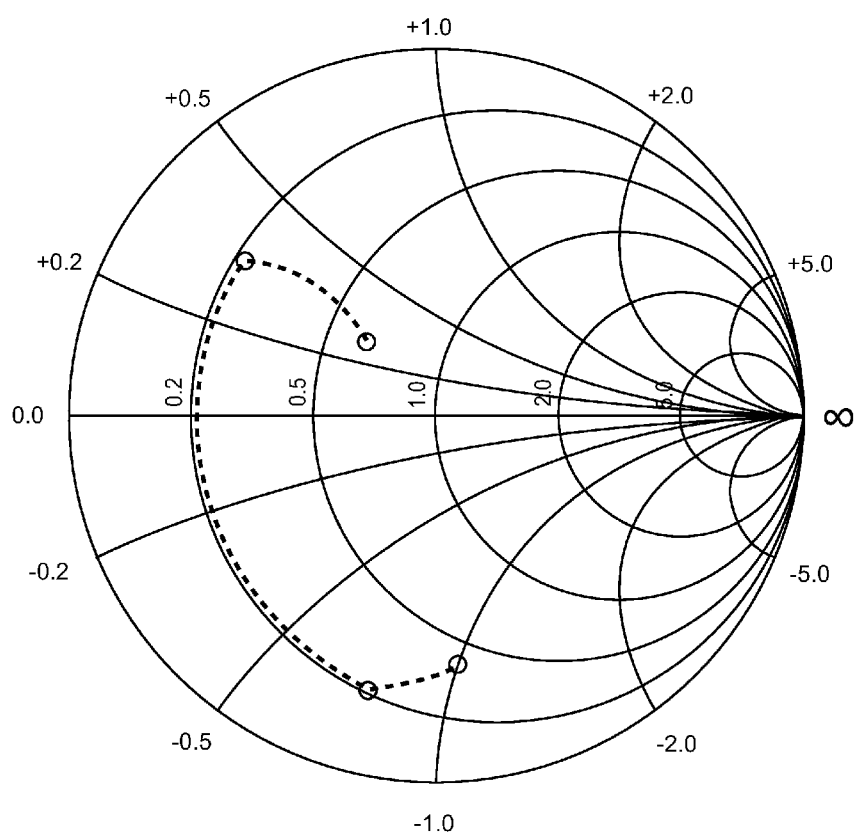
FIG. 46 illustrates the impedance transformation at the end of the ALGORITHM3, including linear averaging through the INNER LOOP power control of the ATU.

In a second case, linear averaging of the power received at the UE 114 and the power received at the BTS 116 may be simulated for an RX to TX offset of 190 MHz with an antenna load of Zload=20-j*50 ohms. FIG. 45 is a Smith chart that includes a plot of the impedance Zload at the UE antenna 132; a node impedance ZVC1 for the variable capacitor VC1; a serial node impedance ZL at L0, which is assumed to have a fixed value; and a node impedance ZVC2 for the variable capacitor VC2 before the start of the ALGORITHM3. FIG. 46 illustrates the impedance transformation at the end of the ALGORITHM3 through the INNER LOOP POWER CONTROL of the ATU 136.

Figure 47:
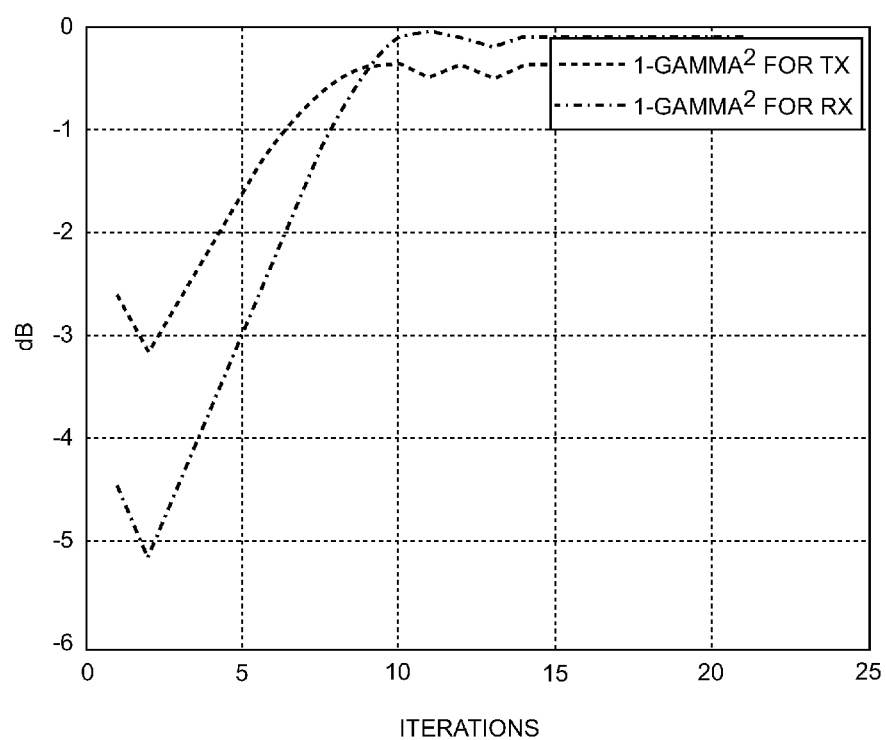
FIG. 47 is a plot of 1-GAMMA$^2$ in dB for both the TX and RX frequencies, wherein linear averaging is used with the ALGORITHM3.

FIG. 47 is a plot of 1-GAMMA$^2$ in dB for both the TX and RX frequencies wherein linear averaging is used with the ALGORITHM3. Note that 1-GAMMA$^2$ for the TX and the RX frequencies are both optimized in an appropriate direction.

Figure 48:
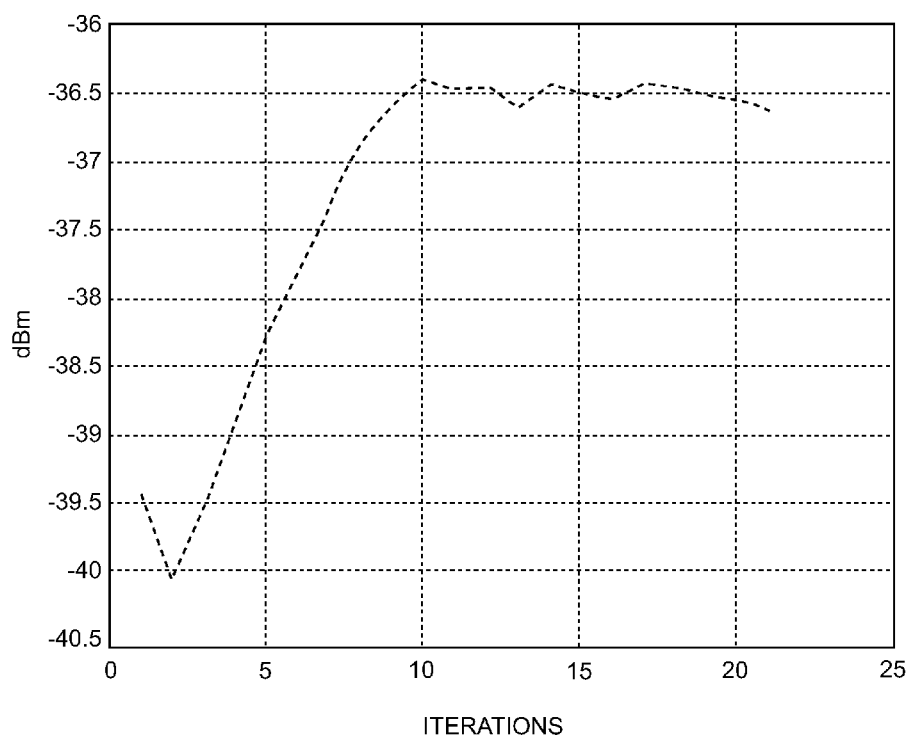
FIG. 48 is a plot of the delivered power at the BTS illustrating a convergence and increase in the delivered power at the BTS after running the ALGORITHM3, including steps that linearly average the power received at the UE and the power received at the BTS.

FIG. 48 is a plot of the delivered power at the BTS 116 illustrating a convergence and increase in the delivered power at the BTS 116 after running the ALGORITHM3, including steps that linearly average the power received at the UE 114 and the power received at the BTS 116. The plot confirms that the delivered power increases by at least 3 dBm after about 10 simulation iterations, which is equivalent to about 10 TSs.

Figure 49:
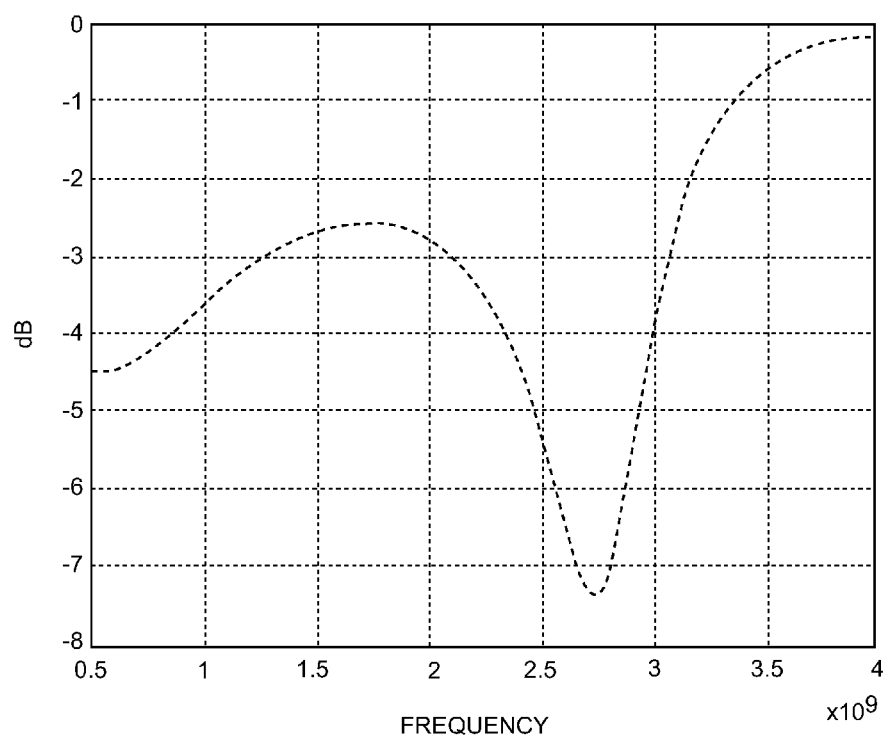
FIG. 49 is a plot of return loss versus frequency prior to running the ALGORITHM3 including logarithmic averaging.

In a third case, logarithmic averaging of the power received at the UE 114 and the power received at the BTS 116 may be simulated for an RX to TX offset of 190 MHz with an antenna load of Zload=20+j*50 ohms. FIG. 49 is a plot of return loss versus frequency prior to running the ALGORITHM3.

Figure 50:
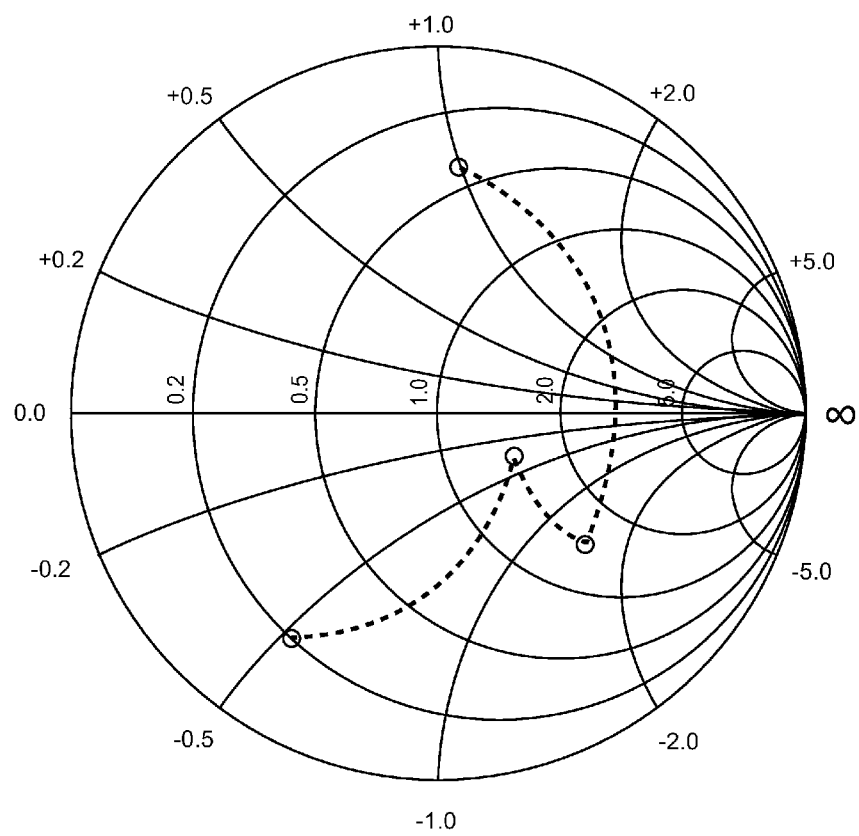
FIG. 50 is a Smith chart that illustrates ATU impedances before the start of the ALGORITHM3, including logarithmic averaging.
Figure 51:
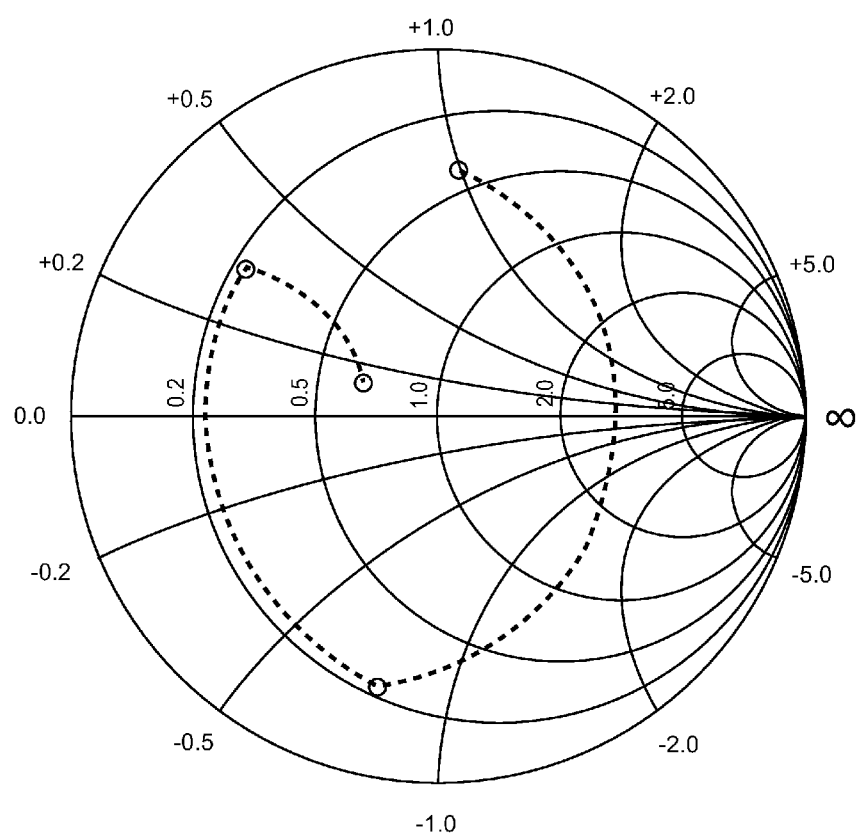
FIG. 51 illustrates the impedance transformation at the end of the ALGORITHM3 through the INNER LOOP power control of the ATU.
Figure 52:
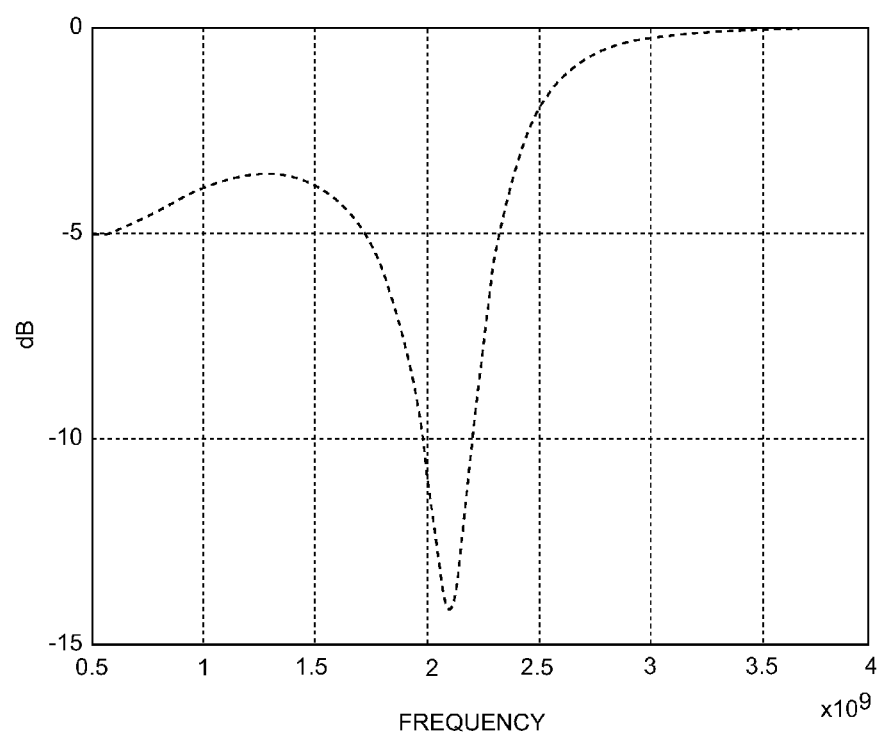
FIG. 52 is a plot of return loss versus frequency prior to running the ALGORITHM3.

FIG. 50 is a Smith chart that includes a plot of the impedance Zload at the UE antenna 132; a node impedance ZVC1 for the variable capacitor VC1; a serial node impedance ZL at L0, which is assumed to have a fixed value; and a node impedance ZVC2 for the variable capacitor VC2 before the start of the ALGORITHM3. FIG. 51 illustrates the impedance transformation at the end of the ALGORITHM3 through the INNER LOOP POWER CONTROL of the ATU 136. FIG. 52 is a plot of return loss versus frequency prior to running the ALGORITHM3.

Figure 53:
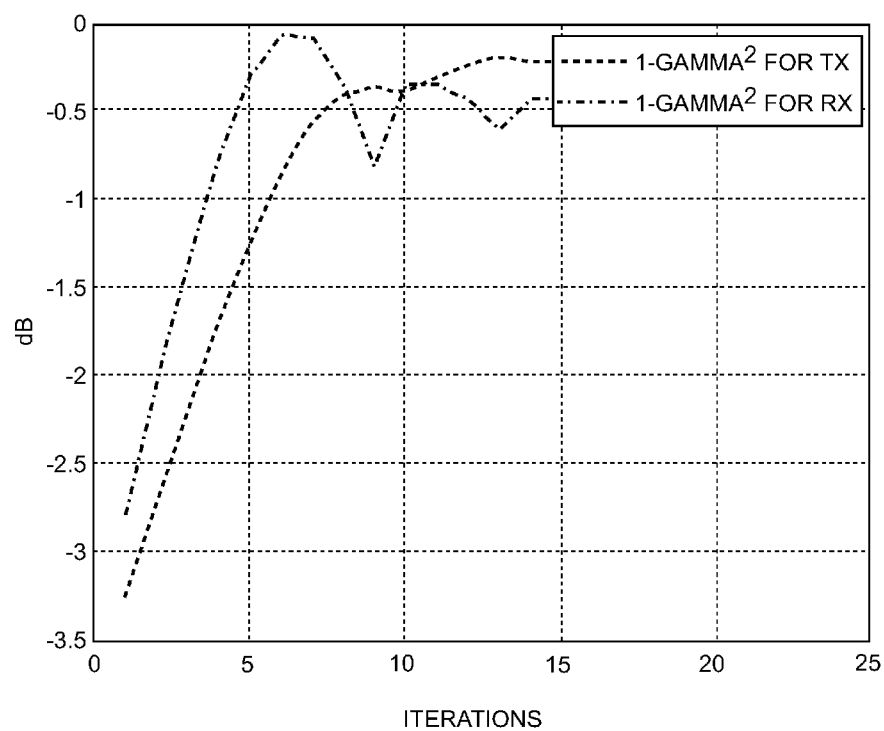
FIG. 53 is a plot of 1-GAMMA$^2$ in dB for both the TX and RX frequencies, wherein logarithmic averaging is used with the ALGORITHM3 including an assumption of path loss and noise.

FIG. 53 is a plot of 1-GAMMA$^2$ in dB for both the TX and RX frequencies wherein logarithmic averaging is used with the ALGORITHM3. Note that 1-GAMMA$^2$ for the TX and the RX frequencies are both optimized in an appropriate direction.

In most instances, it may be preferable for the ALGORITHM3 to be executed on processors of the BTS 116 to control the ATU 136 of the UE 114. However, it is possible to have the UE 114 execute the ALGORITHM3 via a processor such as the second BB power controller 140 (FIG. 9A). In such a case, the UE 114 would measure a received delivered power level based on the downlink inner loop to control the antenna tuning at the RX frequency. Alternately, the UE 114 could use an "averaged" value of the delivered received power at the RX frequency while also receiving from the BTS 116 via the DOWNLINK RADIO CHANNEL a measurement of delivered power level at the TX frequency of the BTS 116.

The BTS 116 could then report to the UE 114 a measured delivered power level at the TX frequency as seen at the BTS 116 using the TPC fields. An average of the two power levels would indicate the delta of the measured power versus a reference target. Thus, when the ALGORITHM3 is enabled to run on the UE 114 by the BTS 116, the BTS 116 would send to the UE 114 the measured delivered power level or delta at the TX frequency based on the Uplink Inner Loop, and the UE 114 would also use this reported value and the receive delivered power at the receive frequency based on the Downlink Inner Loop to calculate an averaging value used by the ALGORITHM3 running on the UE 114 to adjust the ATU 136.

The ALGORITHM3 would then operate at 2*TTI time rate, since the UE 114 would need to wait to adjust the ATU 136. The UE 114 would then update the BTS 116 and wait for the BTS 116 to report the measured power level at the BTS 116. The BTS 114 would then receive the measured power level, while measuring the RX power level at the UE 114 for the same antenna settings.

Figure 54:
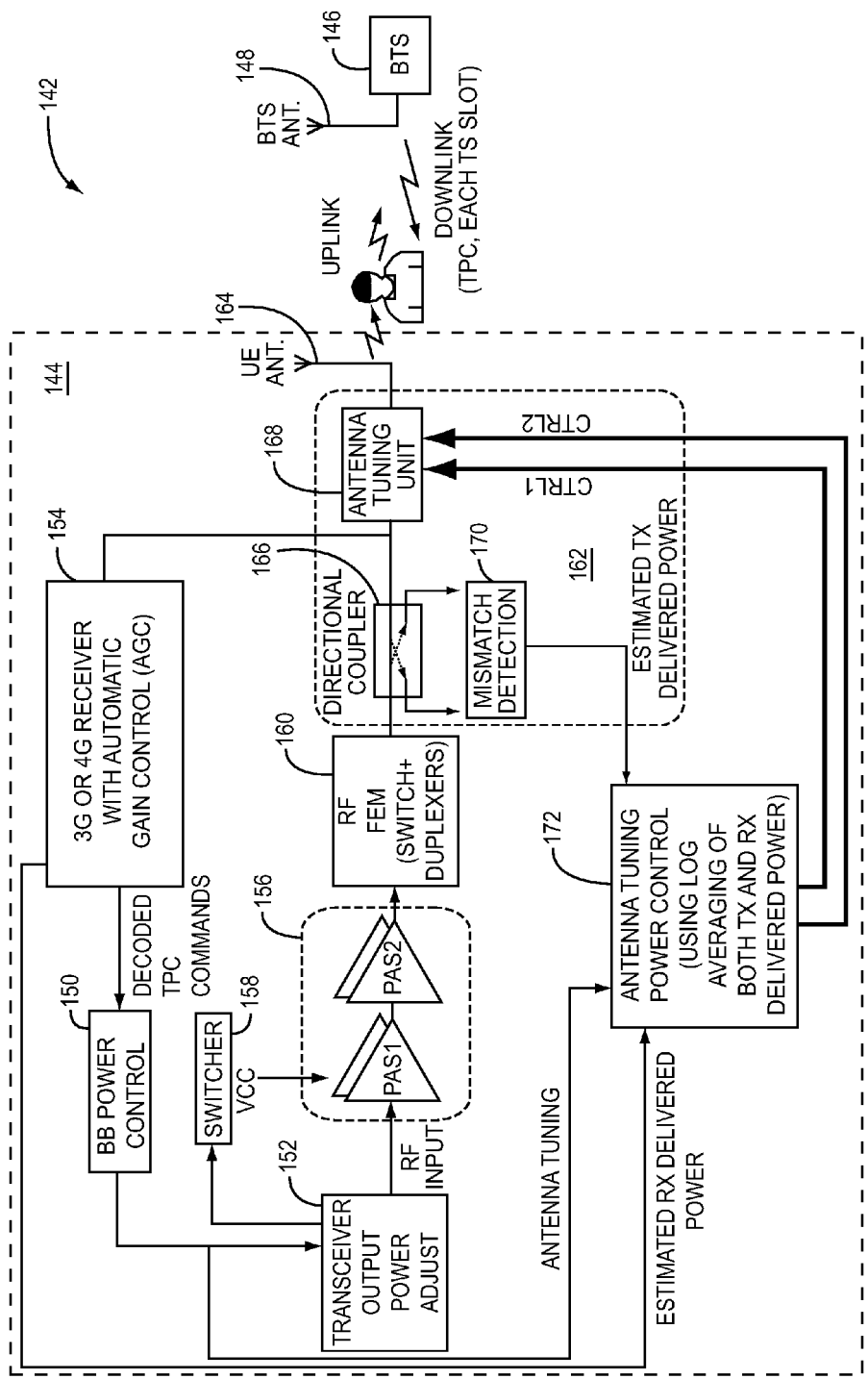
FIG. 54 is a full duplex communication system according to the present disclosure.

FIG. 54 depicts a communication system 142 and a UE 144 that are in accordance with the present disclosure. The UE 144 is in communication with a BTS 146 having a BTS antenna 148. The UE 144 includes a BB power controller 150 for controlling a transceiver output power adjusting function 152. The BB power controller 150 sends a signal to the transceiver output power adjusting function 152 based on TPC commands received from the BTS 146 via a 3G or 4G receiver 154. The 3G or 4G receiver 154 includes automatic gain control (AGC) and is adapted to receive signals that are frequency offset from a duplex transmit frequency. The BTS 146 applies either the ALGORITHM1 or the ALGORITHM2 to generate the TPC commands.

The transceiver output power adjusting function 152 controls the amount of output voltage and/or bias current that is delivered to a PA 156 from a switcher power supply 158. The PA 156 includes PA stages PAS1 and PAS2. The transceiver output power adjusting function 152 also controls the level of an RF INPUT signal.

An amplifier RF signal output from the PA 156 is directed through an RF FEM 160 to an automatic antenna tuning system 162 that is coupled to a UE antenna 164. The automatic antenna tuning system 162 includes a directional coupler 166 that passes a majority of an amplified RF signal into an ATU 168 while directing a sample of the amplified RF signal into a mismatch detector 170.

An antenna tuning power controller 172 receives an ESTIMATED TX DELIVERED POWER from the mismatch detector 170. The antenna tuning power controller 172 receives an ESTIMATED RX DELIVERED POWER at the 3G or 4G receiver 154, and an ANTENNA TUNING SIGNAL output from the BB power controller 150. The antenna tuning power controller 172 averages the ESTIMATED TX DELIVERED POWER and the ESTIMATED RX DELIVERED POWER using a logarithmic averaging method. In response, the antenna tuning power controller 172 outputs a pair of ATU control signals CTRL1 and CTRL2 that are received as input by the ATU 168. In turn, the ATU 168 matches output impedance of the PA 156 with the input impedance of the UE antenna 164 such that UE power delivered to the BTS 146 is maximized. Further still, The ATU 168 is adapted to adjust the tuning elements of the ATU 168 to increase levels of signals being received once the AGC reaches a maximum gain level.

Figure 55:
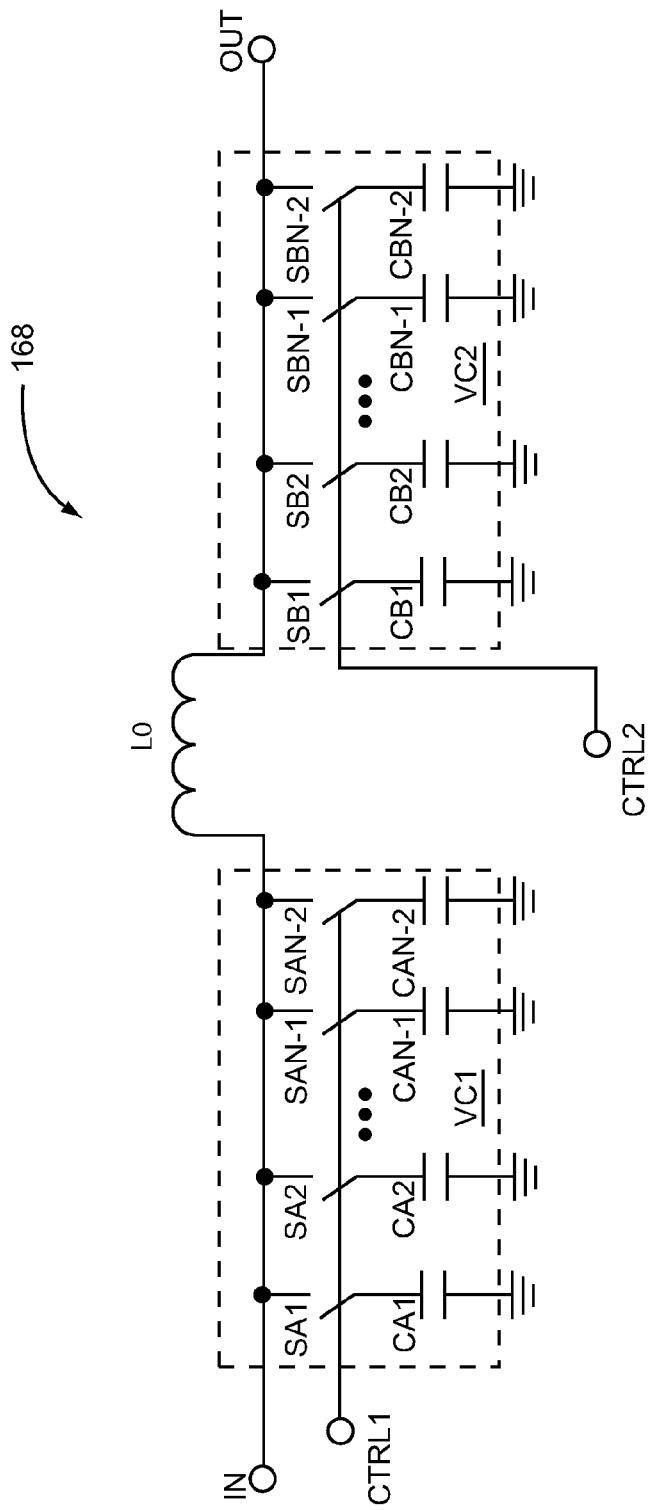
FIG. 55 is an ATU in accordance with the present disclosure.

FIG. 55 is a circuit diagram showing a detailed embodiment of the ATU 168 (FIG. 54). The ATU 168 includes tuning elements that make up the variable capacitor VC1 and the variable capacitor VC2. The tuning elements of the variable capacitor VC1 comprise a first capacitor array made up of a plurality of digitally switchable capacitors CA1, CA2, CAN-1, and CAN-2, where N is a positive integer. The control signal CTRL1 is usable to activate and deactivate the CA1, CA2, CAN-1, and CAN-2 via electronic switches SA1, SA2, SAN-1, and SAN-2, where N is a positive integer.

Similarly, the tuning elements of the variable capacitor VC2 comprise a first capacitor array made up of a plurality of digitally switchable capacitors CB1, CB2, CBN-1, and CBN-2, where N is a positive integer. The control signal CTRL1 is usable to activate and deactivate the CB1, CB2, CBN-1, and CBN-2 via electronic switches SB1, SB2, SBN-1, and SBN-2, where N is a positive integer. Lastly, the inductor L0 is coupled between the variable capacitor VC1 and the variable capacitor VC2 to form a PI network configuration.

Those skilled in the art will recognize improvements and modifications to the preferred embodiments of the present disclosure. All such improvements and modifications are considered within the scope of the concepts disclosed herein and the claims that follow.

What is claimed is:

1. Front end circuitry comprising:
    a baseband (BB) power controller adapted to receive transmit power control (TPC) commands from a base transceiver station (BTS) and output at least one control signal in response to the TPC commands; and
    an antenna tuner unit (ATU) comprising a plurality of variable impedance tuning elements for matching an output impedance of a power amplifier (PA) with an input impedance of an antenna, each one of the plurality of variable impedance tuning elements comprising one of a variable inductor, a variable capacitor, and a variable resistor, wherein the ATU is adapted to receive the at least one control signal from the BB power controller, and adjust one or more of the variable impedance tuning elements in response to the at least one control signal.

2. The front end circuitry of claim 1, wherein power output from the PA is controllable by a control signal output from the BB power controller in response to the TPC commands from the BTS.

3. The front end circuitry of claim 2, wherein the control signal output from the BB power controller is adapted to control output power levels from the PA by adjusting input signal levels of the PA.

4. The front end circuitry of claim 1, wherein the variable impedance tuning elements are variable capacitors that along with an inductor are configured in a PI network configuration.

5. The front end circuitry of claim 4, wherein the BB power controller is adapted to increase or decrease capacitances of the variable capacitors via the at least one control signal from the BB power controller in response to the TPC commands transmitted from the BTS and received by the BB power controller.

6. The front end circuitry of claim 5, wherein "Up" and "Down" power control messages used for inner power loop control in accordance with high speed packet access (HSPA) standards and/or long term evolution (LTE) standards are usable as the TPC commands received by the BB power controller.

7. The front end circuitry of claim 5, wherein the variable capacitors comprise switchable capacitor arrays having capacitors that are switched in and out of the PI network configuration in discrete steps in response to the TPC commands transmitted from the BTS and received by the UE.

8. The front end circuitry of claim 1, further including a forward power detector adapted to generate a signal for switching the BB power controller from adjusting output power of the PA to adjusting one or more of the variable impedance tuning elements of the ATU when a PA output power of a predetermined limit is exceeded.

9. A method for operating front end circuitry comprising:
receiving one or more transmit power control (TPC) commands from a base transceiver station (BTS); and
adjusting one or more variable impedance tuning elements of an antenna tuner unit (ATU) in the front end circuitry based on the one or more TPC commands, each of the one or more variable impedance tuning elements comprising one of a variable inductor, a variable capacitor, and a variable resistor.

10. The method of claim 9 wherein adjusting one or more of the variable impedance tuning elements of the ATU based on the one or more TPC commands comprises:
determining a desired output power level of a signal to be delivered by the front end circuitry to an antenna based on the TPC commands; and
adjusting one or more of the variable tuning elements of the ATU such that the output power level of the front end circuitry is moved towards the desired output power level.

11. The method of claim 9, wherein the variable impedance tuning elements comprise a first capacitor array and a second capacitor array made up of a plurality of digitally switchable capacitors.

12. The method of claim 11, wherein adjusting one or more of the variable impedance tuning elements of the ATU is accomplished by selectively activating or deactivating individual ones of the plurality of digitally switchable capacitors.

13. The method of claim 12, wherein the plurality of digitally switchable capacitors of the first capacitor array are activated or deactivated before the individual ones of the plurality of digitally switchable capacitors of the second capacitor array are activated or deactivated, or vice versa.

14. The method of claim 9, further including a step of averaging a value representative of BTS output power indicated by the one or more TPC commands with a value representative of the output power of the front end circuitry indicated by the one or more TPC commands to determine how to adjust one or more of the variable impedance tuning elements of the ATU.

15. The method of claim 14, wherein the step of averaging is logarithmic averaging.

16. The method of claim 14, wherein the step of averaging is linear averaging.

17. The method of claim 9, wherein the front end circuitry includes a forward power detector adapted to generate a signal for switching a baseband (BB) power controller from adjusting output power of a power amplifier (PA) to adjusting one or more of the variable impedance tuning elements of the ATU, and vice versa.

18. The method of claim 17, further including switching the BB power controller from adjusting the output power of the PA to adjusting one or more of the variable impedance tuning elements of the ATU when a PA output power of a predetermined limit is exceeded, and switching the BB power controller from adjusting one or more of the variable impedance tuning elements of the ATU to adjusting the output power of the PA when the PA output power drops below the predetermined limit.

19. An inner power control loop for a cellular communications network, comprising:
a base transceiver station (BTS) comprising:
a first function block adapted to measure a user equipment (UE) uplink signal quality and outputting a signal to interference ratio (SIR) target;
a second function block adapted to receive and compare an SIR estimate (SIREST) of the UE uplink signal quality with the SIR target, and in response generate transmit power control (TPC) commands; and
a UE comprising:
a power amplifier (PA);
an antenna;
a baseband (BB) power controller adapted to receive the TPC commands from the BTS and output at least one control signal in response to the TPC commands;
and an antenna tuner (ATU) comprising a plurality of variable impedance tuning elements for matching an output impedance of the PA with an input impedance of the antenna, each one of the plurality of variable impedance tuning elements comprising one of a variable inductor, a variable capacitor, and a variable resistor, wherein the ATU is adapted to receive the at least one control signal from the BB power controller, and adjust one or more of the variable impedance tuning elements in response to the at least one control signal.

20. The inner power control loop of claim 19, wherein power output from the PA is controllable by a control signal output from the BB power controller in response to the TPC commands from the BTS.

21. The inner power control loop of claim 20, wherein the control signal output from the BB power controller is adapted to control power output from the PA by adjusting input signal levels of the PA.

22. The inner power control loop of claim 19, wherein the variable impedance tuning elements are variable capacitors that along with an inductor are configured in a PI network configuration.

23. The inner power control loop of claim 22, wherein the BB power controller is adapted to increase or decrease capacitances of the variable capacitors via the at least one control signal from the BB power controller in response to the TPC commands transmitted from the BTS and received by the UE.

24. The inner power control loop of claim 23, wherein up and down power control messages used for inner power loop control in accordance with high speed packet access (HSPA) standards and/or long term evolution (LTE) standards are usable as the TPC commands received by the BB power controller.

25. The inner power control loop of claim 23, wherein the variable capacitors comprise arrays of switchable capacitors that are switched in and out of the PI network configuration in discrete steps in response to the TPC commands transmitted from the BTS and received by the UE.

26. The inner power control loop of claim 19, further including a forward power detector adapted to generate a signal for switching the BB power controller from adjusting output power of the PA to adjusting one or more of the variable impedance tuning elements of the ATU when a PA output power of a predetermined limit is exceeded.

27. The inner power control loop of claim 19, wherein the UE includes a receiver with automatic gain control (AGC), the receiver being adapted to receive signals that are frequency offset from a duplex transmit frequency.

28. The inner power control loop of claim 27, wherein the ATU is further adapted to adjust one or more of the variable impedance tuning elements of the ATU to increase levels of the signals being received once the AGC reaches a maximum gain level.

* * * * *